(12) United States Patent
Labaziewicz et al.

(10) Patent No.: US 7,256,944 B2
(45) Date of Patent: Aug. 14, 2007

(54) COMPACT IMAGE CAPTURE ASSEMBLY USING MULTIPLE LENSES AND IMAGE SENSORS TO PROVIDE AN EXTENDED ZOOM RANGE

(75) Inventors: Peter Labaziewicz, Tokyo (JP); Wilbert F. Janson, Jr., Shortsville, NY (US); Kenneth A. Parulski, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 133 days.

(21) Appl. No.: 11/061,001

(22) Filed: Feb. 18, 2005

(65) Prior Publication Data

US 2006/0187311 A1  Aug. 24, 2006

(51) Int. Cl.
G02B 15/14 (2006.01)
(52) U.S. Cl. ........................ 359/676; 359/683
(58) Field of Classification Search ............... 359/676, 359/683
See application file for complete search history.

(56) References Cited

U.S. PATENT DOCUMENTS

| | | | |
|---|---|---|---|
| 3,497,614 A | 2/1970 | Petrocelli et al. | |
| 4,097,882 A | 6/1978 | Engelsmann | |
| 4,199,785 A | 4/1980 | McCullough et al. | |
| 4,765,722 A | 8/1988 | Aono | |
| 4,989,078 A | 1/1991 | Paxton | |
| 5,051,830 A | 9/1991 | von Hoessle | |
| 5,164,831 A | 11/1992 | Kuchta et al. | |
| 5,448,319 A | 9/1995 | Uzawa | |
| 5,648,835 A | 7/1997 | Usawa | |
| 5,668,597 A | 9/1997 | Parulski et al. | |
| 5,929,903 A | 7/1999 | Kiesow | |
| 6,008,845 A | 12/1999 | Ohyoshi | |
| 6,104,432 A | 8/2000 | Nakamura et al. | |
| 6,288,742 B1 * | 9/2001 | Ansari et al. .......... 348/211.14 |
| 6,611,289 B1 | 8/2003 | Yu et al. | |
| 6,728,482 B2 * | 4/2004 | Hagimori et al. ............. 396/72 |
| 6,804,460 B1 | 10/2004 | Oshima et al. | |
| 2002/0163582 A1 | 11/2002 | Gruber et al. | |
| 2003/0020814 A1 | 1/2003 | Ono | |
| 2003/0160886 A1 | 8/2003 | Misawa et al. | |
| 2003/0202113 A1 | 10/2003 | Yoshikawa | |

FOREIGN PATENT DOCUMENTS

| | | |
|---|---|---|
| JP | 59-181313 | 10/1984 |
| JP | 3340093 | 8/2002 |
| JP | 3340094 | 8/2002 |
| JP | 3570253 | 7/2004 |

* cited by examiner

Primary Examiner—Scott J. Sugarman
(74) Attorney, Agent, or Firm—Pamela R. Crocker

(57) ABSTRACT

An optical image capture assembly for use in an electronic camera includes a first image sensor for generating a first sensor output; a first lens for forming a first image of the scene on the first image sensor; a second image sensor for generating a second sensor output; and a zoom lens for forming a second image of the scene on the second image sensor. The camera is contained within an enclosure and, in one variation of the assembly, either the first lens or the zoom lens (or both) forms its image through a folded optical system in which an optical path between the lens and its respective image sensor is folded at an angle in order to conserve space within the enclosure.

10 Claims, 22 Drawing Sheets

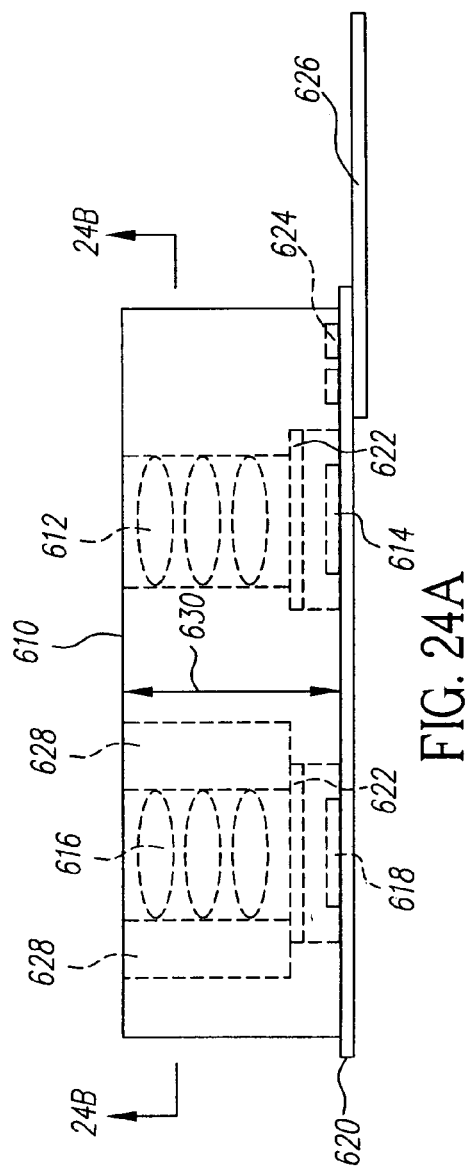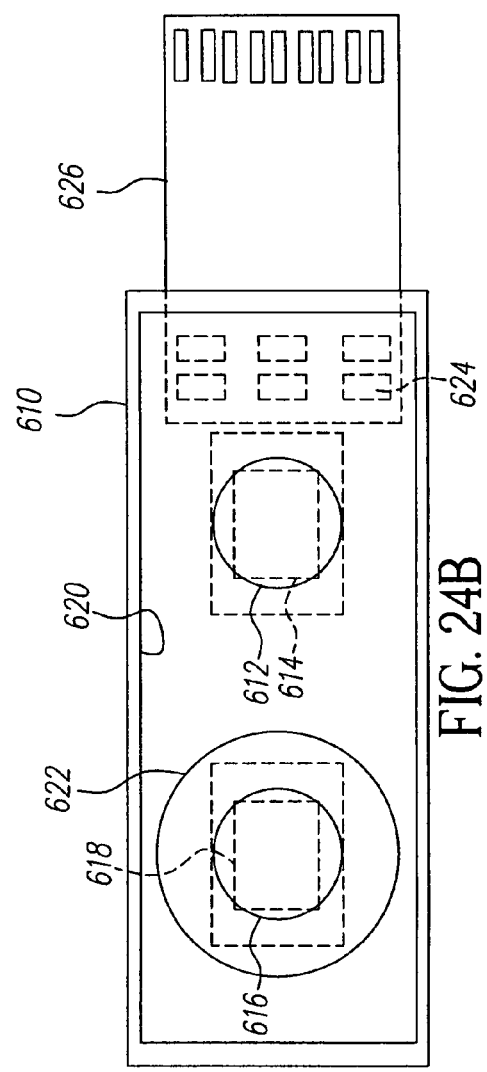
FIG. 24A
FIG. 24B

COMPACT IMAGE CAPTURE ASSEMBLY USING MULTIPLE LENSES AND IMAGE SENSORS TO PROVIDE AN EXTENDED ZOOM RANGE

FIELD OF THE INVENTION

The present invention relates to a digital camera that produces digital image files and, more particularly, to a digital camera that uses multiple lenses and image sensors to provide an extended zoom range.

BACKGROUND OF THE INVENTION

Currently, most digital cameras use a zoom lens and a single color image sensor to capture still and motion images. The captured images are then digitally processed to produce digital image files, which are stored in a digital memory in the camera. The digital image files can then be transferred to a computer, displayed, and shared via the Internet. The digital camera can be included as part of a mobile telephone, to form a so-called "camera phone". The camera phone can transmit the digital image files to another camera phone, or to service providers, via a mobile telephone network.

Small camera size and a large "optical zoom range" are two very important features of digital cameras. Users prefer to have a large zoom range (e.g. 5:1 or greater) rather than a limited zoom range (e.g. 3:1 or smaller). Unfortunately, providing a large zoom range lens, without sacrificing the quality of the captured images, increases the size of the digital camera. Large zoom range lenses are also more costly. Thus, there are fundamental trade-offs between small camera size, large zoom range, and low camera cost which must be made when designing a digital camera. With higher cost cameras, such as single lens reflex cameras, these problems are sometimes addressed by using multiple interchangeable zoom lenses, such as two 3:1 zoom lenses, e.g., a 28-70 mm zoom and a 70-210 zoom. Such an option, which has its own problems in user inconvenience, is nonetheless not available for low cost digital cameras.

The prior art of most interest can be separated into two categories: image capture systems that use multiple lenses, usually two, having the same focal length and image capture systems that utilize multiple lenses, also usually two, having different focal lengths.

Addressing the first category, some digital cameras use multiple image sensors to form a color image. In most cameras of this type, a single lens is used to provide an image of the scene, which is then separated into multiple colors by a prism beam splitter. Multiple monochrome image sensors are used to capture red, green, and blue color separation images. However, as disclosed in U.S. Pat. No. 6,611,289, entitled "Digital Cameras Using Multiple Sensors with Multiple Lenses" and issued Aug. 26, 2003 in the name of Yu et al., it is possible to use multiple image sensors and multiple lenses to provide color separation. However, this patent discloses teaches that the lenses all have the same focal length, and are all used together, in order to simultaneously capture the different color components of the image.

Some digital imaging systems also use multiple image sensors and multiple lenses to capture different portions of the digital image. Such a system is disclosed in U.S. Published Patent Application No. US20020163582 A1, entitled "Self-calibrating, Digital, Large Format Camera with Single or Multiple Detector Arrays and Single or Multiple Optical Systems" and published Nov. 7, 2002 in the names of Gruber et al. In one embodiment disclosed in this published patent application, a large format digital camera exposes multiple detector arrays using multiple lens systems to acquire sub-images of overlapping sub-areas of large area objects. The sub-images are stitched together to form a large format digital macro-image. However, all of the lenses have the same focal length, and all are used simultaneously to capture the different sub-areas of the image.

Stereo film cameras and stereo electronic cameras are known in the prior art. These cameras typically have two horizontally separated lenses of the same focal length, which focus two slightly different images of the scene onto two image sensors or two frames of film. Such a system is disclosed in commonly assigned U.S. Pat. No. 4,989,078, entitled "Still Video Camera for Recording. Stereo Images on a Video Disk" and issued on Jan. 21, 1991 in the name of K. Bradley Paxton. The two images provide a so-called "stereo pair", which simulates the slightly different perspectives that a person's left and right eyes would see when viewing the scene. In the aforementioned patent disclosure, the two lenses are designed to provide the same magnification, and both are used to simultaneously capture the left and right eye images on a pair of image sensors in order to achieve a stereo effect.

Film cameras that use multiple lenses to capture multiple images at the same time are also known in the prior art. For example, some instant film cameras used to produce identification pictures can capture four small images simultaneously on the same piece of instant film. The four lenses in these cameras provide the same magnification, and all are used to simultaneously capture the four images.

According to the second category of prior art, film cameras that include two or more lenses to provide two or more different focal lengths are also known in the prior art. For example, such cameras can use two different fixed focal length lenses which are slid in front of the same film plane. This provides an inexpensive "two-position zoom" capability, that is, two fixed focal length lenses that provide, e.g., the wide angle and telephoto angle settings of a corresponding zoom lens. In another example, in U.S. Pat. No. 4,097,882, entitled "Multiple Lens Camera Having Lens-position Controlled Focal-length Adjustment" and issued Jun. 27, 1978 in the name of Engelsmann, a "110" size pocket film camera has a carrier mounting three or more lenses of different focal lengths that can be selectively moved transverse to the optical axis of the camera so as to place any one of the lenses in an operating position relative to a film plane.

Digital cameras that include two lenses to provide two different focal lengths are also known in the prior art. A lens turret is popularly used to obtain multiple focal lengths in a camera. However, in the case of a digital still camera or especially in the case of mobile phone digital camera, lens modules are required to be extremely small due to the limited space for the lens module. U.S. Pat. No. 6,804,460, entitled "Lens Turret with Back Focal Length Adjustment" and issued Oct. 12, 2004 in the names of Oshima et al., describes a lens turret that is said to be extremely compact and flat in size and suitable for digital still cameras and mobile phone digital cameras. The lens turret is rotatable around an axis and has a wide-angle lens and a telephoto-angle lens mounted thereon, and a driving mechanism rotates the lens turret so that one of the lenses can be set at a picture taking position opposite an image sensor. By means of back focal length adjustment, the position of the lens with the shorter focal length can be fixed on the lens turret at the same level thereon as the lens with the longer focal length.

It is also known to use a two lens arrangement in a film scanner, where two lenses with different combinations of focal lengths are used to capture variable sized images. For instance, in commonly assigned U.S. Pat. No. 5,929,903, entitled "Multiposition Lens Mechanism for a Scanner" and issued Jul. 27, 1999 in the name of R. H. Kiesow, a removable digital camera, which is tethered to a computer, is supported in a housing in a film scanner in the optical path of a multiposition lens assembly having a single focal length lens and a zoom lens. The lens assembly positions the lenses in the optical path of the camera for scanning different sized images, e.g., two or more film format sizes. However, these cameras, both film and digital, that use multiple focal length lenses share the characteristic of using only a single "sensor", that is, a single film or a single electronic image sensor.

In U.S. Pat. No. 6,288,742, entitled "Video Camera Including Multiple Image Sensors" and issued Sep. 11, 2001 in the names of Ansari et el., a digital motion camera useful in teleconferencing includes two lenses and two image sensors. As disclosed in this patent, the first lens is an 8 mm fixed focus lens for providing a relatively wide-angle view of a room and the second lens is a 16 mm lens with manual focus control for providing high resolution document transmission capability. The first lens is oriented for a room view of a conference participant to provide face-to-face communication during a videotelephone conference, and the second lens is oriented at a substantial angle to the first lens for viewing a document, e.g., on a table. During a videotelephone conference, such a camera permits fast switching between an image of the room as seen through the first lens or an image of a document as seen through the second lens, without the need for expensive and tediously slow moving pan/tilt stages and/or a plurality of complete camera units. Another camera, the Sanyo S750 UMTS cellphone camera, has a similar kind of dual imaging capability, where an inwardly facing VGA imager captures an image of the caller using the cellphone while an outwardly facing 1 megapixel imager captures an image of a scene that the caller is looking at. Such cameras, however, are not useful in the environment of the present invention because the lenses are not collecting images from the same scene.

In U.S. Pat. No. 4,199,785, entitled "Electronic Zoom Feature" and issued Apr. 22, 1980 in the name of McCullough et al., a television system employs two (or more) fixed focal length vidicon cameras, one camera with a wide angle field of view and the other camera with a narrow angle field of view, and an electronic zoom feature for zooming between the two fields of view. The cameras are boresighted such that the field of view of the smaller field camera is within, and usually centered in the field of view of the larger field camera. The "zoom" is accomplished by manipulating the scan generators of the two cameras and expanding the central portion of the display with the image from the smaller field camera as the zoom amount is progressively increased. This system, of course, is an alternative to a single optical zoom lens, whose usage the patent disclosure discourages as they (optical zooms) are lower quality, more expensive and mechanically more complex than fixed focal length lenses. However, the inherent drawback of an electronic zoom is also low quality since the resolution of the electronic zoom feature ordinarily is limited by the number of scan lines available for zooming. Consequently, this patent disclosure is devoted to controlling the scan lines of the two vidicon cameras so as to be able to zoom without an effective loss of resolution.

In U.S. Pat. No. 5,051,830, entitled "Dual Lens System for Electronic Camera" and issued Sep. 24, 1991 in the name of Hoessle, a double focal length electronic camera (used on board a guided missile) includes a single lens system component having a short focal length section integrated into the center of a surrounding lens section having a long focal length, where each focal length section has its own dedicated picture array sensor. Here too, this lens system is a substitute for a single motor driven zoom, which the disclosure denigrates because of size, expense, heaviness, inherent complexity; furthermore, an optical zoom is "which is important—much too slow with respect to its use" (col. 2, line 1 of the Hoessle patent).

None of these prior art systems, and especially the multifocal length prior art systems, provide a sufficiently compact, low cost, large zoom range optical system for a small, lightweight and relatively inexpensive consumer digital camera. As especially pointed out in the aforementioned Hoessle patent, it is additionally desirable to avoid the slowness so typical of zoom usage and to be able to traverse a large zoom range quickly. What is therefore needed is a digital camera that provides a rapidly-operating extended zoom range without unduly increasing the size or cost of the digital camera.

SUMMARY OF THE INVENTION

The object of this invention is to provide an extended zoom range in a digital camera without unduly increasing the size or cost of the camera.

Another object of this invention is to provide an extended optical zoom range in a digital camera by means of a plurality of separate lenses and corresponding image sensors.

Another object of this invention is to provide an extended optical zoom range in a digital camera by means of a compact image capture assembly including a plurality of separate lenses and corresponding image sensors.

The present invention is directed to overcoming one or more of the problems set forth above. Briefly summarized, the invention comprises an optical image capture assembly for use in an electronic camera, where the assembly comprises: a first image sensor for generating a first sensor output; a first lens for forming a first image of the scene on the first image sensor; a second image sensor for generating a second sensor output; and a zoom lens for forming a second image of the scene on the second image sensor, wherein the zoom lens is adjustable between a minimum focal length and a maximum focal length to provide the second image. In one variation of this embodiment, the camera is contained within an enclosure and at least one of the first lens and the zoom lens forms its image through a folded optical system in which an optical path between the lens and its respective image sensor is folded at an angle in order to conserve space within the enclosure.

These various aspects of the invention provide significant technical advantages. By providing a plurality of optical image capture modalities within a digital camera, wherein each modality includes a lens-sensor combination with a distinctive different focal length or combination of focal lengths (i.e., a zoom), the conflicted requirements (namely, large size, high cost and compromised optical quality) engendered by digital camera consumer desire for a large zoom ratio, e.g., 10:1, can be accomplished in a smaller scale space at lower cost with higher quality optical results than heretofore achieved.

These and other aspects, objects, features and advantages of the present invention will be more clearly understood and appreciated from a review of the following detailed description of the preferred embodiments and appended claims, and by reference to the accompanying drawings.

BRIEF DESCRIPTION OF THE DRAWINGS

FIGS. 24A and 24B are two views of the image capture assembly used in the cell phone shown in FIGS. 23A and 23B.

DETAILED DESCRIPTION OF THE INVENTION

Figure 1:
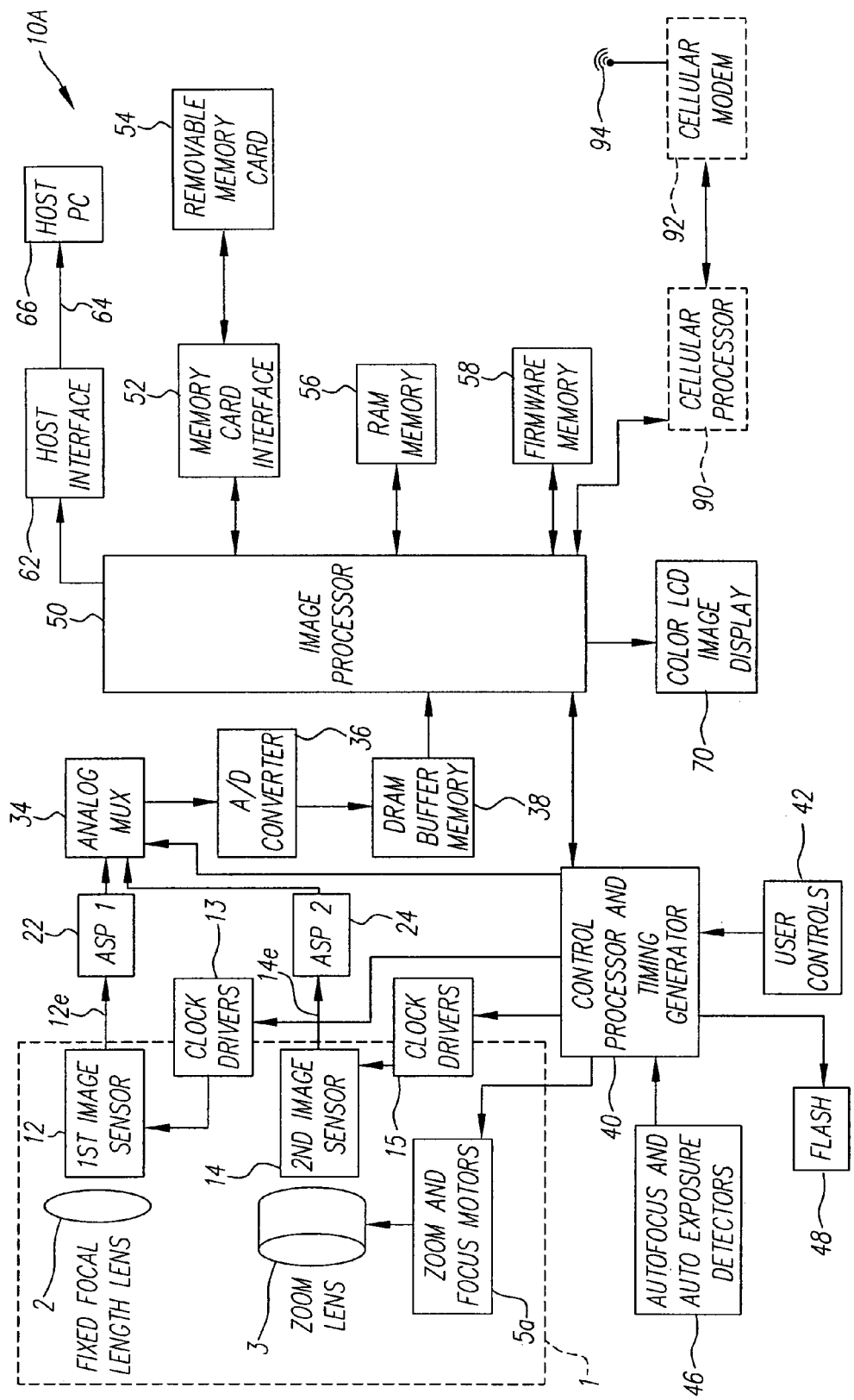
FIG. 1 depicts a block diagram of a first embodiment of a digital camera using a fixed focal length, wide-angle lens with a first image sensor, and a zoom lens with a second image sensor.

Because digital cameras employing imaging devices and related circuitry for signal processing are well known, the present description will be directed in particular to elements forming part of, or cooperating more directly with, apparatus in accordance with the present invention. Elements not specifically shown or described herein may be selected from those known in the art. Certain aspects of the embodiments to be described may be provided in software. Given the system as shown and described according to the invention in the following materials, software not specifically shown, described or suggested herein that is useful for implementation of the invention is conventional and within the ordinary skill in such arts.

Each of the several embodiments of the present invention include an image capture assembly having multiple lenses and multiple image sensors mounted within a digital camera in order to provide an extended zoom range. This can reduce the cost and size of the camera, and improve its optical performance, compared with a camera having a single sensor and a large range zoom lens (e.g. having a 10:1 zoom range). While not in an exactly coaxial arrangement with respect to each other, the multiple lenses and sensors are generally aligned with respect to each other so as to be viewing substantially the same object, albeit with different fields of view. Each image capture assembly comprises two or more optical relay subassemblies having a lens and an image sensor disposed at opposing ends thereof and a folded optical path for directing the light from the lens to the sensor. This configuration can further reduce the size of the optical components, thereby enabling the design and manufacture of a very thin and compact camera. While the folded optics are used in many of the preferred embodiments, a folded optical path is not generally necessary for practice of the invention. This is particularly true for the wide angle optical subassemblies since the focal length of such wide angle lenses is very short to begin with. Also, the size of the sensor, and consequently the size of the image that must be produced to fill the sensor, may be small enough to reduce the focal length to an acceptable front-to-back dimension—even for normal and short telephoto focal lengths.

In each embodiment, the camera includes a control element for selecting either the first sensor output from the first image sensor or a sensor output from one of the other image sensors, thereby providing a selected sensor output that may be provided to a processing section in the camera for producing an output image. Moreover, each embodiment includes some type of user control that allows a user to select a focal length, either directly or via some marking (e.g., "panoramic" or "portrait") indicative of a focal length; the aforementioned control element is then responsive to the user control for selecting a corresponding sensor output. In some embodiments, a single "zoom lens" user control is used, e.g., where the "wide" setting selects a wide angle fixed focal length lens and the "tele" setting(s) select various positions of a zoom lens. The user control output is then provided to the control element, which selects the image sensor that is used to produce the output image. When the selected sensor is for the zoom lens, the user control (or the control element) also enables the zoom and focus motors for the zoom lens to drive the zoom lens to the selected focal length. In addition, digital zooming may be used to zoom "up" from the wide angle setting to the minimum focal length setting of the zoom lens. All this, of course, may be transparent to the user, who simply manipulates the "zoom lens" user control between the "wide" and "tele" settings.

Referring first to FIGS. 10A-10F, several diagrams are shown of the optical layout of several embodiments of an image capture assembly 1, which is included within the various embodiments of a digital camera (which will be described later). These diagrams include the optical relay subassemblies 1a, 1b and 1c containing the aforementioned folded optical elements. In each of the FIGS. 10A-10F, a circle 1d delineates an optical profile of a front surface of a digital camera through which the respective lenses protrude. The optical relay subassemblies 1a, 1b and 1c are folded behind the lenses and, as will be described, covered by the front surface of the camera.

Figure 10A:
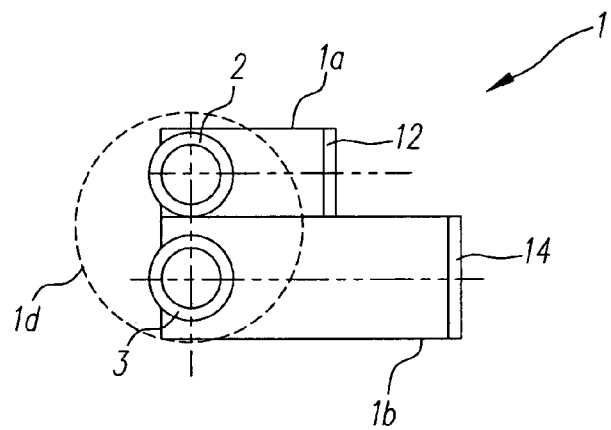
FIGS. 10A, 10B, 10C, 10D, 10E and 10F diagram the optical layout of several embodiments of the image capture assembly used in the cameras shown in FIGS. 1, 4, 7, 19 and 21 according to the invention.

In a first embodiment of the present invention, a digital camera employs a first fixed focal length wide angle lens 2 with a first image sensor 12, and a zoom lens 3 with a second image sensor 14. In the first embodiment as shown in FIG. 10A, an image capture assembly 1 includes the first lens 2 and the first image sensor 12 mounted at opposing ends of a first optical relay subassembly 1a having a folded optical path arranged between the first image sensor 12 and the lens 2. The first lens 2, which preferably is a fixed focal length wide angle lens, forms a first image of a scene on the first image sensor 12. The image capture assembly 1 also includes the zoom lens 3 and the second image sensor 14 mounted at opposing ends of a second optical relay subassembly 1b having a folded optical path arranged between the second image sensor 14 and the zoom lens 3. The zoom lens 3, which has a range of focal lengths adjustable between a minimum focal length and a maximum focal length, forms a second image of the scene on the second image sensor 14. In this embodiment, the first lens 2 is a wide angle lens having a focal length less, and preferably substantially less, than the minimum focal length of the zoom lens 3.

Figure 10B:
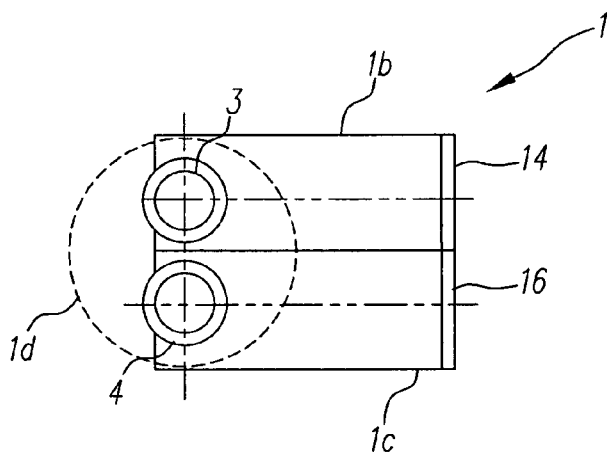

In a second embodiment of the present invention, a digital camera employs a first zoom lens 3 with an image sensor 14, and a second zoom lens 4 with an image sensor 16. In the second embodiment as shown in FIG. 10B, the image sensor 14 will be characterized as the first image sensor 14 and the image sensor 16 will be characterized as the second image sensor 16. Accordingly, the image capture assembly 1 includes the first zoom lens 3 and the first image sensor 14 mounted at opposing ends of a first optical relay subassembly 1b having a folded optical path arranged between the first image sensor 14 and the first zoom lens 3. The first zoom lens 3, which has a range of focal lengths adjustable between a minimum focal length and a maximum focal length, forms a first image of the scene on the first image sensor 14. The image capture assembly 1 also includes the second zoom lens 4 and the second image sensor 16 mounted at opposing ends of a second optical relay subassembly 1c having a folded optical path arranged between the second image sensor 16 and the zoom lens 4. The zoom lens 4, which has a range of focal lengths adjustable between a minimum focal length and a maximum focal length, forms a second image of the scene on the second image sensor 16. In this embodiment, the maximum focal length of the first zoom lens 3 is less than or equal to the minimum focal length of the second zoom lens 4.

Figure 10C:
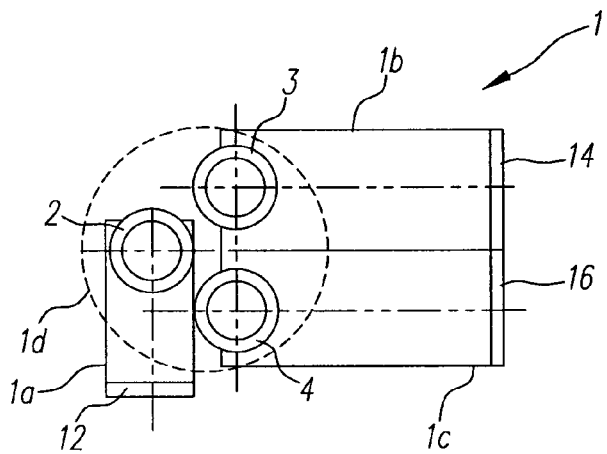

In a third embodiment of the present invention, the digital camera employs a first zoom lens 3 with an image sensor 14, a second zoom lens 4 with an image sensor 16 and a fixed focal length, wide angle lens 2 with an image sensor 12. In the third embodiment as shown in FIG. 10C, the image sensor 14 will be characterized as the first image sensor 14, the image sensor 16 will be characterized as the second image sensor 16, and the image sensor 12 will be characterized as the third image sensor. Accordingly, the first zoom lens 3 forms a first image of the scene on the first image sensor 14, and the second zoom lens 4 forms a second image of the scene on the second image sensor 16, similarly to what is shown and described in FIG. 10B. In addition, a third lens, the fixed focal length lens 2, and the third image sensor 12 are mounted at opposing ends of a third optical relay subassembly 1a having a folded optical path arranged between the third image sensor 12 and the third lens 2. In this embodiment, the third lens 2 preferably is a fixed focal length wide angle lens having a focal length less, and preferably substantially less, than the minimum focal length of the first zoom lens 3, and the maximum focal length of the first zoom lens 3 is less than or equal to the minimum focal length of the second zoom lens 4.

Figure 10D:
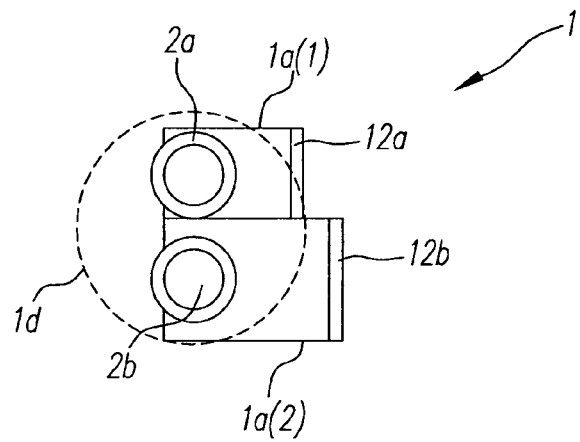

In a fourth embodiment of the invention, the digital camera employs a first fixed focal length lens 2a with a first image sensor 12a, and a second fixed focal length lens 2b with a second image sensor 12b. In the fourth embodiment as shown in FIG. 10D, an image capture assembly 1 includes the first fixed focal length lens 2a and the first image sensor 12a mounted at opposing ends of a first optical relay subassembly 1a(1) having a folded optical path arranged between the first image sensor 12a and the first fixed focal length lens 2a. The image capture assembly 1 also includes the second fixed focal length lens 2b and the second image sensor 12b mounted at opposing ends of a second optical relay subassembly 1a(2) having a folded optical path arranged between the second image sensor 12b and the second fixed focal length lens 2b. In this embodiment, the first fixed focal length lens 2a is preferably a wide angle lens and the second fixed focal lens 2b is a telephoto lens.

Figure 10E:
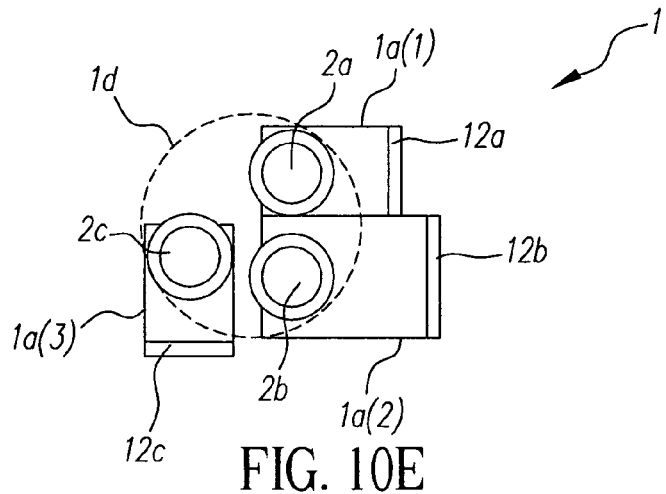

In a fifth embodiment of the present invention, the digital camera employs a first fixed focal length lens 2a with a first image sensor 12a, a second fixed focal length lens 2b with a second image sensor 12b and a third fixed focal length lens 2c with a third image sensor 12c. In the fifth embodiment as shown in FIG. 10E, the first lens 2a and the first image sensor 12a are mounted at opposing ends of a first optical relay subassembly 1a(1) having a folded optical path arranged between the first image sensor 12a and the first lens 2a. The first lens 2a, which preferably is a fixed focal length ultra wide angle lens, forms a first image of the scene on the first image sensor 12a. The second lens 2b and the second image sensor 12b are mounted at opposing ends of a second optical relay subassembly 1a(2) having a folded optical path arranged between the second image sensor 12b and the second lens 2b. The second lens 2b, which preferably is a fixed focal length medium angle lens, forms a second image of the scene on the second image sensor 12b. The third lens 2c and the third image sensor 12c are mounted at opposing ends of a third optical relay subassembly 1a(3) having a folded optical path arranged between the third image sensor 12c and the third lens 2c. The third lens 2c, which preferably is a fixed focal length narrow angle (telephoto) lens, forms a third image of the scene on the third image sensor 12c.

Figure 10F:
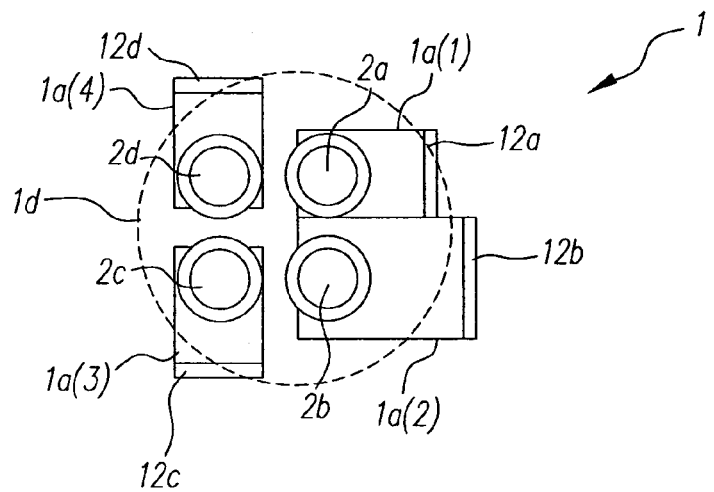

In a sixth embodiment of the present invention, the digital camera employs a first fixed focal length lens 2a with a first image sensor 12a, a second fixed focal length lens 2b with a second image sensor 12b, a third fixed focal length lens 2c with a third image sensor 12c, and a fourth fixed focal lens 2d with a fourth image sensor 12d. In the sixth embodiment as shown in FIG. 10F, the first lens 2a and the first image sensor 12a are mounted at opposing ends of a first optical relay subassembly 1a(1) having a folded optical path arranged between the first image sensor 12a and the first lens 2a. The first lens 2a, which preferably is a fixed focal length ultra wide angle lens, forms a first image of the scene on the first image sensor 12a. The second lens 2b and the second image sensor 12b are mounted at opposing ends of a second optical relay subassembly 1a(2) having a folded optical path arranged between the second image sensor 12b and the second lens 2b. The second lens 2b, which preferably is a fixed focal length medium angle lens, forms a second image of the scene on the second image sensor 12b. The third lens 2c and the third image sensor 12c are mounted at opposing ends of a third optical relay subassembly 1a(3) having a folded optical path arranged between the third image sensor 12c and the third lens 2c. The third lens 2c, which preferably is a fixed focal length narrow angle (telephoto) lens, forms a third image of the scene on the third image sensor 12c. The fourth lens 2d and the fourth image sensor 12d are mounted at opposing ends of a fourth optical relay subassembly 1a(4) having a folded optical path arranged between the fourth image sensor 12d and the fourth lens 2d. The fourth lens 2d, which preferably is a fixed focal length very narrow angle (long telephoto) lens, forms a fourth image of the scene on the fourth image sensor 12d.

These embodiments may clearly be carried as far as possible—i.e., more than four lenses, four sensors and four optical relay subassemblies—as long as their arrangement is practically possible within the spatial confines of the digital camera.

Figure 11:
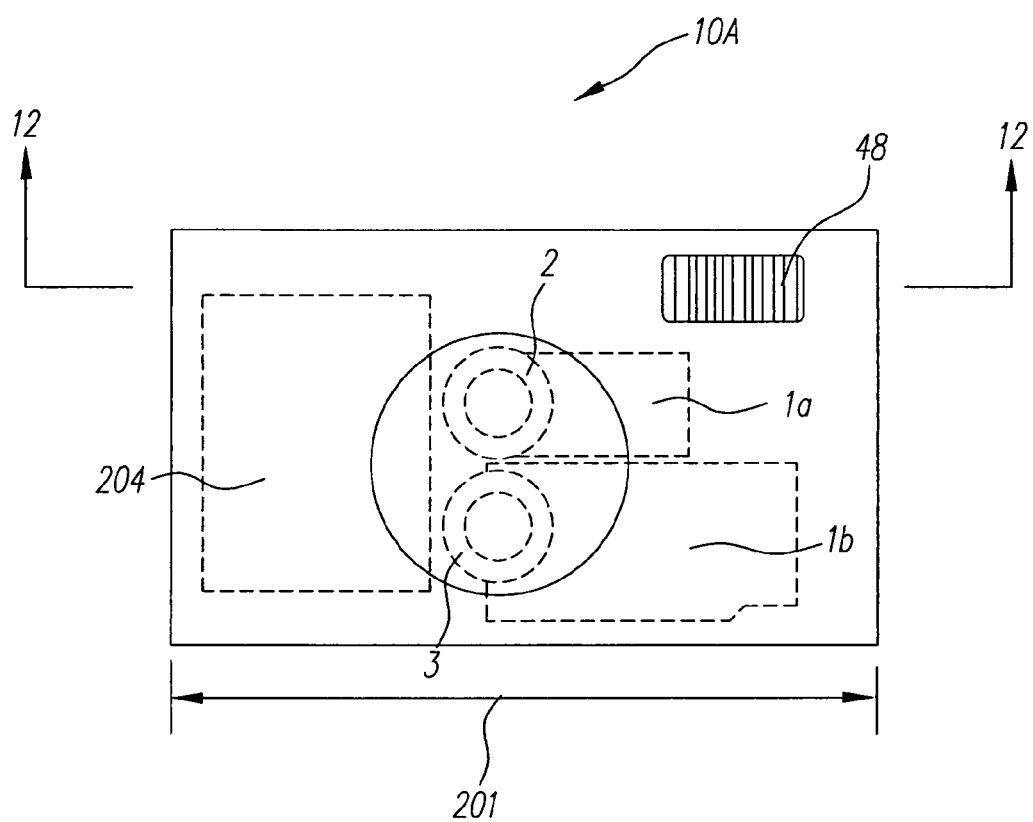
FIG. 11 is a frontal view of a digital camera employing two image capture assemblies, one fixed focal length and the other zoom, of the type shown in FIGS. 10A-10F.
Figure 12:
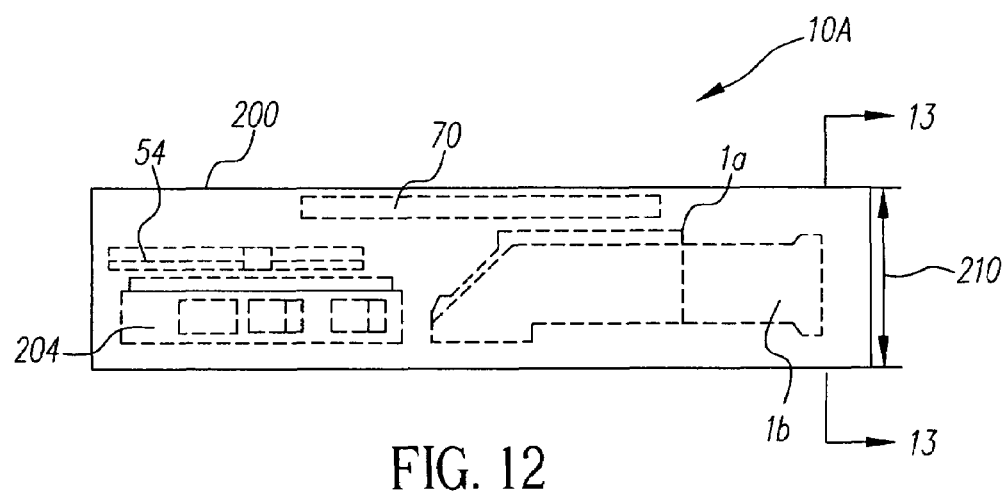
FIG. 12 is a top view of the digital camera shown in FIG. 11.
Figure 13:
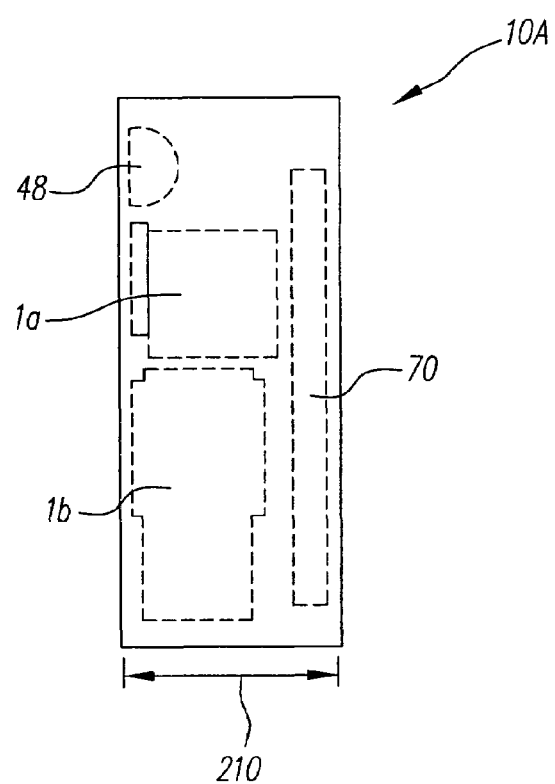
FIG. 13 is a side view of the digital camera shown in FIG. 11.

FIG. 11 provides a spatial layout of a digital camera, showing how the various components described in FIG. 10A fits within the confined space of the digital camera 10A. For example, FIGS. 11 and 12 show how the image capture assembly 1 is arranged within the width-wise dimension 201 of a digital camera 10A for the first embodiment shown in FIG. 10A. FIG. 11 is a frontal view of the digital camera 10A showing how the fixed focal length lens subassembly 1a and the zoom lens subassembly 1b are positioned to one side of the lenses 2 and 3 beneath an electronic flash 48. A battery compartment 204 is located on the other side of the lenses 2 and 3. FIG. 12 is a top view of the digital camera 10A taken along lines 12-12 in FIG. 11, and further shows the location of a removable memory card 54 and a color LCD image display 70. FIG. 13 is a side view of the digital camera 10A taken along the lines 13-13 in FIG. 12, and further shows the vertical spacing of the fixed focal length lens subassembly 1a, the zoom lens subassembly 1b, and the flash 48. It is particularly noteworthy that the folded optics employed in the subassemblies 1a and 1b enable the image capture assembly 1 to fit within a compact front to rear dimension 210 of the camera 10A. It is also noteworthy that the embodiment of FIG. 10D, employing two fixed focal length lens subassemblies 1a(1) and 1a(2), could be substituted into the arrangement shown in FIG. 1, thereby enabling a camera with even a lesser width-wise dimension 201.

Figure 14A:
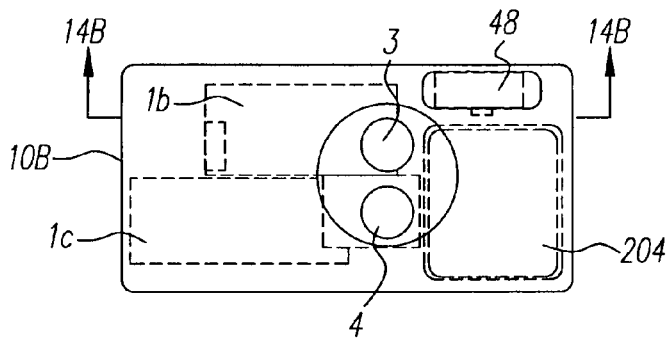
FIGS. 14A, 14B and 14C are three views of a digital camera employing two image capture assemblies, both zoom, of the type shown in FIGS. 10A-10F.
Figure 14B:
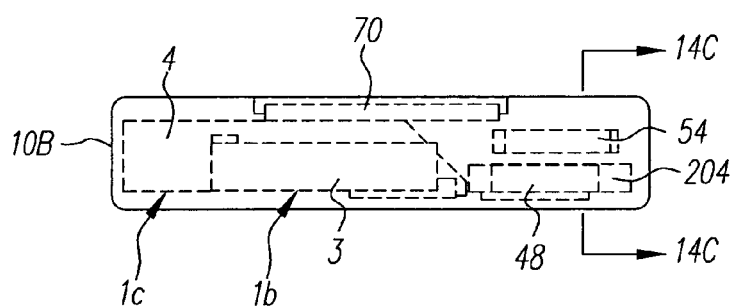
Figure 14C:
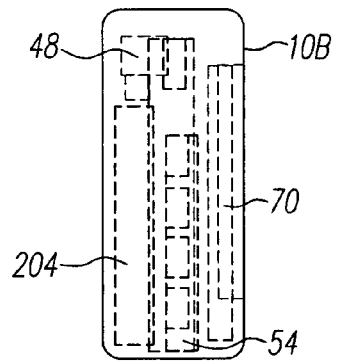
Figure 15A:
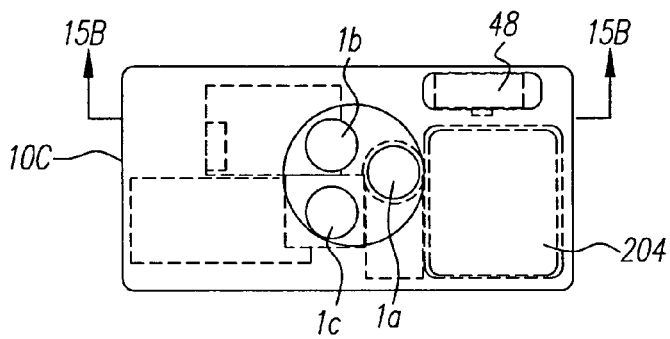
FIGS. 15A, 15B and 15C are three views of a digital camera employing three image capture assemblies of the type shown in FIGS. 10A-10F.
Figure 15B:
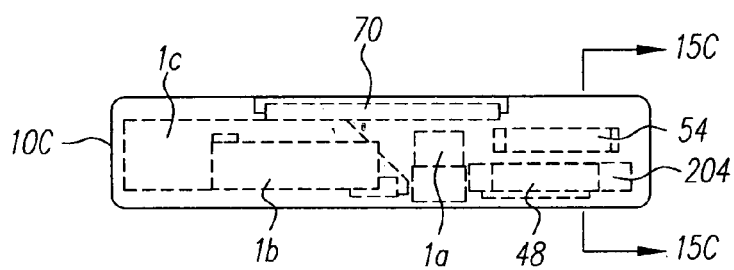
Figure 15C:
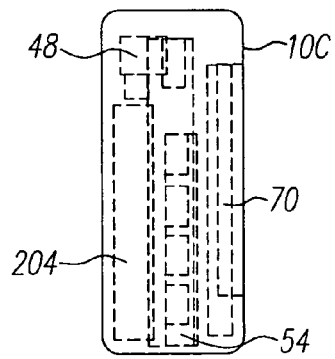

FIGS. 14A, 14B, and 14C show an arrangement of the components in the second embodiment shown in FIG. 10B within the digital camera 10B, where FIG. 14B is a top view taken along the lines 14B-14B in FIG. 14A, and FIG. 14C is a side view taken along the lines 14C-14C in FIG. 14B. Note that, because of the larger size of the second zoom subassembly 1c, the spatial relationship of the components has been rearranged. The battery compartment 204 has now been moved under the flash 48, thereby freeing up more room on the opposite side of the lenses 3 and 4 for the folded optics. Similarly, FIGS. 15A, 15B and 15C show an arrangement of the components in the third embodiment shown in FIG. 1C, where FIG. 15B is a top view taken along the lines 15B-15B in FIG. 15A, and FIG. 15C is a side view taken along the lines 15C-15C in FIG. 15B. It should be clear from these illustrations that the front-to-back folding of the optical systems offers significant advantages over the prior art, and over even such an optical system as shown in the aforementioned Hoessle reference (U.S. Pat. No. 5,051, 830), which shows two optical paths integrated into one system. The narrow front-to-back dimension 210 produces a pocket-sized camera, and in the context of this invention, a pocket-sized camera with zoom, or zoom-like, features.

In each of the above embodiments, the image capture assembly may be integrated into the manufacture of the digital camera or it may stand alone as a fungible component that is, e.g., separately manufactured and supplied to a camera manufacturer for insertion into the camera. The image capture assembly may further include a control section for driving the sensors and selecting either the first sensor output from the first image sensor or a sensor output from one of the other image sensors. In addition, in some embodiments the sensors in the image capture assembly may be positioned next to each other on a common circuit board assembly, or may be packaged in a common integrated circuit package, and the lenses in the image capture assembly may be provided in a common lens assembly that mounts onto the circuit board or the integrated circuit package. In some preferred embodiments, the separate imaging arrays are part of the same CCD or CMOS integrated circuit, and the two lenses are assembled together and aligned with the sensor package.

Moreover, in the foregoing embodiments providing a plurality of three or more image sensors for generating three or more sensor outputs, and a plurality of three or more lenses for forming a corresponding three or more images of the scene on the corresponding three or more image sensors, the lenses employed may be provided in different spatial arrangements within the front optical profile 1d of the digital camera. Where three lenses are employed, the three lenses may be provided within the optical profile 1d on the camera in a triangular arrangement, as shown in FIG. 10C or 10E. Where four lenses are employed, the four lenses may be provided within the optical profile 1d on the camera in a rectangular arrangement as shown in FIG. 10F.

Furthermore, in each of the embodiments, when the fixed, or maximum, focal length of one lens is less than the minimum focal length of the next greater focal length lens, there is a focal length gap left between the two lenses. In that case, the processing section in the camera may include an electronic zooming capability for electronically zooming over at least a portion of the focal length gap. Consequently, if a single "zoom lens" user control is used, a transition between some settings of the user control will cause a zoom lens to move to a particular optical zoom position, while a transition between other settings of the user control will cause the processor to digitally zoom up from an optical image output of the wide angle lens. For example, where the electronic camera provides a zoom setting over a range including a wide angle optical focal length and a group of optical focal lengths provided by at least one tele zoom lens, at least some of the intervening focal lengths in the gap between the wide angle focal length and the zoom focal lengths of the tele zoom are provided by electronically zooming up from an image captured at the wide angle optical focal length. Furthermore, the wide angle optical focal length that is being zoomed can be provided by the maximum focal length of another (wide angle) zoom lens.

Figure 16A:
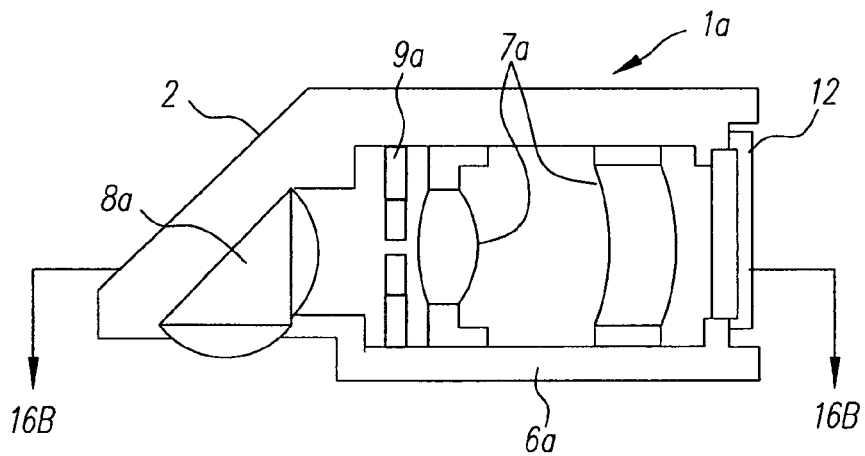
FIGS. 16A and 16B show two views of the optical relay subassembly shown in the various embodiments of FIGS. 10A-10F for supporting a fixed focal length lens in relation to an image sensor along a folded optical path according to the invention.
Figure 16B:
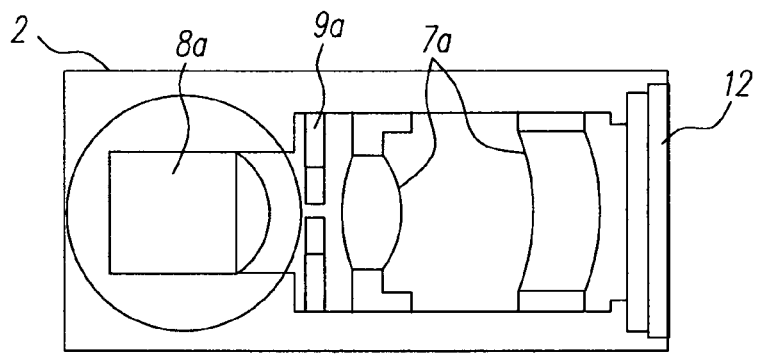
Figure 17:
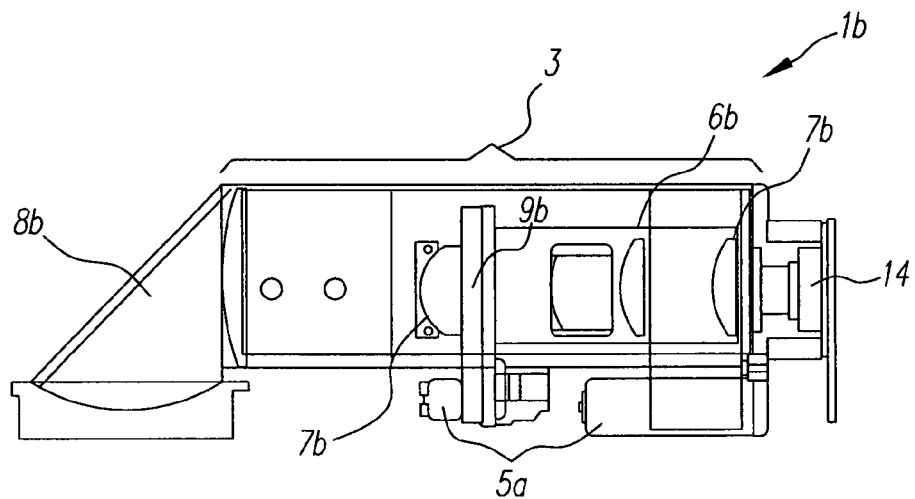
FIG. 17 shows the optical relay subassembly shown in the various embodiments of FIGS. 10A-10F for supporting a zoom lens in relation to an image sensor along a folded optical path according to the invention.

FIGS. 16A and 16B show two views of the optical relay subassembly 1a shown in FIGS. 10A, and 10C-10F for supporting a fixed focal length lens 2 in relation to an image sensor 12 along a folded optical path according to the invention. FIG. 16A shows a lens barrel 6a for supporting the outer objective of the fixed focal length lens 2, the image sensor 12 and associated relay lens components 7a in an optical path that is folded by a mirror prism 8a. In addition, the lens barrel 6a supports an aperture shutter assembly 9a in the optical path. FIG. 16B is a view taken along the line 16B-16B in FIG. 16A, showing an appearance of the optical subassembly 1a from the face of the camera (as shown generally in FIG. 10A). FIG. 17 shows the optical relay subassembly 1b (or 1c) shown in FIGS. 10A, 10B and 10C for supporting a zoom lens 3 (or 4) in relation to an image sensor 14 (or 16) along a folded optical path according to the invention. FIG. 17 shows a fixture 6b for supporting the outer objective of the zoom lens 3 (or 4), the second image sensor 14 (or third image sensor 16), and movable relay (zoom) lens components 7b in an optical path that is folded by a mirror prism 8b. In addition, the fixture 6b supports an aperture shutter assembly 9b in the optical path. FIG. 17 also shows the zoom and focus motors 5a for controlling the movement of the lens components 7b.

FIG. 1 depicts a block diagram of a digital camera 10A, which utilizes the first embodiment of the present invention. The digital camera 10A is a portable battery operated device, small enough to be easily handheld by a user when capturing and reviewing images. In the preferred embodiment, the digital camera 10A produces still digital images that are stored on a removable memory card 54. The digital camera may produce motion digital images, either exclusively or in addition to the still images, that are also stored on the memory card 54.

The digital camera 10A includes the aforementioned image capture assembly 1 described in FIGS. 10A and 11, comprising a fixed focal length lens 2 that focuses an image of a scene (not shown) onto a first image sensor 12, and a zoom lens 3 which focuses an image of the scene onto a second image sensor 14. The image capture assembly 1 provides a first image output 12e from the first image sensor 12 and a second image output 14e from the second image sensor 14. In one preferred embodiment, the images sensors 12 and 14 are identical in size, both as to aspect ratio and pixel size, the lens 2 is an ultra-wide angle lens with a "35 mm film equivalent focal length" of 22 mm (written as 22 mm equiv., where 22 mm is the focal length of a 35 mm photographic film camera that provides the same field of view as the fixed lens 2 provides to the image sensor 12, as defined in the ANSI/13A IT10.7000-2004 standard available from the American National Standards Institute, Inc., New York, N.Y.), and the zoom lens 3 is a 3:1 zoom lens having a 38 mm-114 mm equiv. focal length range.

The 35 mm film equivalent focal length (f.l.) can be calculated using the formula:

35 mm-equiv. $f.l$=(actual lens $f.l$. (in mm)×43.27 mm)/(diagonal sensor focal plane distance (in mm)).

For example, if the image sensor uses a ½" type optical format, it has a focal plane of 6.4 mm (width)×4.8 mm (height), with a diagonal distance of 8.0 mm. If this type of image sensor is used with a lens having an actual focal length of 4.0 mm, the 35 mm equiv. focal length is 22 mm.

Because the focal length of the fixed lens 2 generates an ultra-wide angle field of view, e.g., 22 mm equiv., it has a fixed focus set to a distance near the lens hyperfocal distance of 8 feet, so that objects from 4 feet to infinity are in focus. Therefore, fixed lens 2 does not need to include a focus adjustment. The fixed focal length lens 2 includes an adjustable aperture and shutter assembly 9a (as shown FIGS. 16A and 16B) to control the exposure of the image sensor 12. The zoom lens 3 is controlled by zoom and focus motors 5a and an adjustable aperture and shutter assembly 9b (as shown in FIGS. 17A and 17B) to control the exposure of the image sensor.

In a preferred embodiment, the image sensors 12 and 14 are single-chip color Megapixel CCD sensors, using the well-known Bayer color filter pattern to capture color images. The image sensors 12 and 14 can have, for example, a 4:3 image aspect ratio and a total of 3.1 effective megapixels (million pixels), with 2048 active columns of pixels× 1536 active rows of pixels. The image sensors 12 and 14 can use a ½" type optical format, so that each pixel is approximately 3.1 microns tall by 3.1 microns wide. A control processor and timing generator 40 controls the first image sensor 12 by supplying signals to clock drivers 13, and controls the second image sensor 14 by supplying signals to clock drivers 15.

The control processor and timing generator 40 also controls the zoom and focus motors 5a, and a flash 48 for emitting light to illuminate the scene. The control processor and timing generator 40 also receives signals from automatic focus and automatic exposure detectors 46. In an alternative embodiment, instead of using the automatic focus and automatic exposure detectors 46, the image sensor 14 could be used to provide exposure detection and "through-the-lens" autofocus, as described in commonly-assigned U.S. Pat. No. 5,668,597, which is entitled "Electronic Camera with Rapid Automatic Focus of an Image upon a Progressive Scan Image Sensor" and which issued Sep. 26, 1997 in the names of Kenneth A. Parulski, Masaki Izumi, Seiichi Mizukoshi and Nobuyuki Mori, and which is incorporated herein by reference. User controls 42 are used to control the operation of the digital camera 10A.

The analog output signal 12e from the first image sensor 12 is amplified by a first analog signal processor (ASP 1) 22 and provided to a first input of a control element 34, e.g., an analog multiplexer control element. The analog output signal 14e from the second image sensor 14 is amplified by a second analog signal processor (ASP 2) 24 and provided to a second input of the control element 34, that is, the analog multiplexer control element. The function of the control element 34 is to select either the first sensor output 12e from the first image sensor 12 or the second sensor output 14e from the second image sensor 14, thereby providing a selected sensor output from the image capture assembly 1.

The control processor and timing generator 40 controls the analog multiplexer control element 34 in order to provide the output of either the (ASP 1) 22 or the (ASP 2) 24 to an analog-to-digital (A/D) converter circuit 36. The digital data provided by the A/D converter 36 is stored in a DRAM buffer memory 38 and subsequently processed by an image processor 50. The processing performed by the image processor 50 is controlled by firmware stored in a firmware memory 58, which can be flash EPROM memory. The processor 50 processes the input digital image file, which is buffered in a RAM memory 56 during the processing stage.

In an alternative embodiment (not shown), two A/D converter circuits are connected to the outputs of ASP 1 (22) and ASP 2 (24) and the analog mux 34 is not used. Instead, a digital multiplexer is used to select which one of the outputs of the two A/D converters is connected to the DRAM buffer memory 38.

The processed digital image file is provided to a memory card interface 52, which stores the digital image file on the removable memory card 54. Removable memory cards 54 are one type of removable digital image storage medium, and are available in several different physical formats. For example, the removable memory card 54 can include (without limitation) memory cards adapted to well-known formats, such as the Compact Flash, SmartMedia, MemoryStick, MMC, SD, or XD memory card formats. Other types of removable digital image storage media, such as magnetic hard drives, magnetic tape, or optical disks, can alternatively be used to store the still and motion digital images. Alternatively, the digital camera 10A can use internal non-volatile memory (not shown), such as internal Flash EPROM memory to store the processed digital image files. In such an embodiment, the memory card interface 52 and the removable memory card 54 are not needed.

The image processor 50 performs various housekeeping and image processing functions, including color interpolation followed by color and tone correction, in order to produce rendered sRGB image data. The rendered sRGB image data is then JPEG compressed and stored as a JPEG image file on the removable memory card 54. The rendered sRGB image data may also be provided to a host PC 66 via a host interface 62 communicating over a suitable interconnection, such as a SCSI connection, a USB connection or a Firewire connection. The JPEG file uses the so-called "Exif" image format defined in "Digital Still Camera Image File Format (Exif)" version 2.1, July 1998 by the Japan Electronics Industries Development Association (JEIDA), Tokyo, Japan. This format includes an Exif application segment that stores particular image metadata, including the date/time the image was captured, as well as the lens f/number and other camera settings.

It should be noted that the image processor 50, while typically a programmable image processor, can alternatively be a hard-wired custom integrated circuit (IC) processor, a general purpose microprocessor, or a combination of hard-wired custom IC and programmable processors.

The image processor 50 also creates a low-resolution "thumbnail" size image, which can be created as described in commonly-assigned U.S. Pat. No. 5,164,831, entitled "Electronic Still Camera Providing Multi-Format Storage Of Full And Reduced Resolution Images" and issued in the name of Kuchta, et al., the disclosure of which is herein incorporated by reference. After images are captured, they can be quickly reviewed on a color LCD image display 70 by using the thumbnail image data. The graphical user interface displayed on the color LCD image display 70 is controlled by the user controls 42.

In some embodiments of the present invention, the digital camera 10A is included as part of a camera phone. In such embodiments, the image processor 50 also interfaces to a cellular processor 90, which uses a cellular modem 92 to transmit digital images to a cellular network (not shown) using radio frequency transmissions via an antenna 94. In some embodiments of the present invention, the image capture assembly 1 may be an integrated assembly including the lenses 2 and 3, the image sensors 12 and 14, and zoom and focus motors 5a. In addition, the clock drivers 13 and 15, as well as the analog signal processors 22 and 24, the analog mux 34, and the A/D converter 36, may be part of the integrated assembly.

Figure 2A:
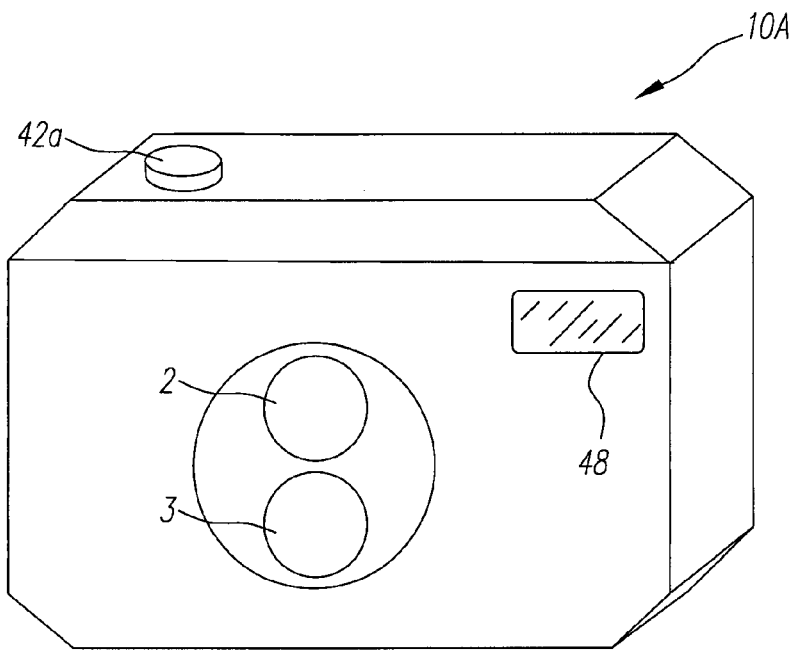
FIGS. 2A and 2B are two perspective views of the digital camera shown in FIG. 1.
Figure 2B:
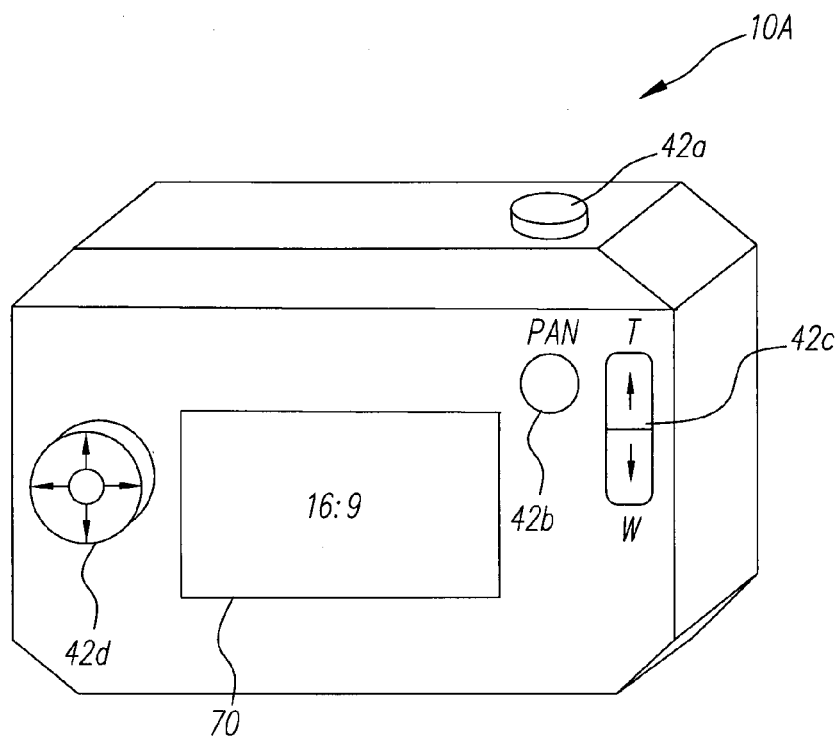

FIGS. 2A and 2B show perspective views of the digital camera 10A described in relation to FIG. 1. FIG. 2A is a frontal view of the camera 10A, showing the fixed focal length lens 2, the zoom lens 3 and the flash 48. The fixed focal length lens is preferably an ultra wide angle lens; a suitable lens has a 22 mm equiv. focal length and an f/2 maximum aperture. The zoom lens is preferably an ultra-thin lens, e.g., a prism lens; a suitable zoom would be a 3:1 zoom ratio lens, such as a 38-114 mm equiv. focal length zoom lens. A prism lens is a lens configuration, such as shown in FIGS. 16A, 16B, and 17, that incorporates a prism 8a, 8b for folding the optical path, thereby creating a very compact optical construction. Clearly, other lens focal lengths and lens type constructions are within the scope of the invention. FIG. 2B is a rear view of the camera 10A, showing the color (LCD) image display 70 and a number of user controls 42, including a shutter button 42a for enabling an image capture sequence, a panoramic button 42b for enabling a panoramic mode, a zoom button 42c for enabling a selection of a zoom setting, and a multi-position selector 42d for navigating through images, menu choices and the like that are displayed on the color LCD display 70.

Figure 18:
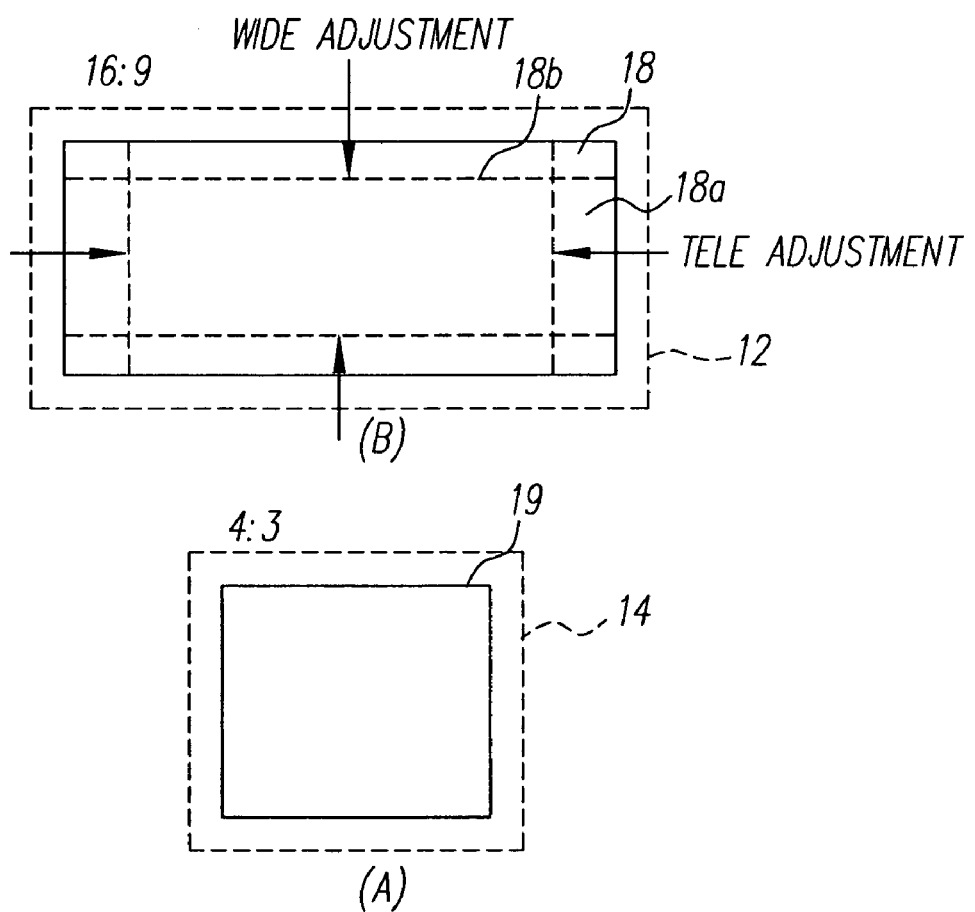
FIGS. 18A and 18B show two imagers with different panoramic aspect ratios and the effect obtained by changing the aspect ratio.

In a further embodiment, the aspect ratio of the image provided by the fixed focal length lens 2 and the image sensor 12 may be different than the aspect ratio of the image provided by the zoom lens 3 and the image sensor 14. For example the image sensor 12 can have a 16:9 image aspect ratio, with 2730 active columns of pixels×1536 active rows of pixels, for a total of 4.2 effective megapixels. Consequently, the display 70 is preferably a wide aspect ratio (e.g., 16:9) format display. As shown in FIGS. 18A and 18B, the aspect ratio of the image sensor 12 (shown in broken line) may represent a panoramic image 18 (e.g., a 16:9 aspect ratio panoramic image as shown in FIG. 18A) and the aspect ratio of the image sensor 14 (shown in broken line) may represent a typical television aspect ratio image 19 (e.g., a 4:3 aspect ratio image as shown in FIG. 18B). In this case, the user control 42 may input user commands to the control processor and timing generator 40 for changing the aspect ratio of the stored images which are provided by the image sensor 12 in order to obtain a variable panoramic effect that transitions from the wide angle of the lens 2 toward a narrower angle approaching the effect of the 4:3 aspect ratio of the zoom lens 3. This is accomplished by cropping the image data which has been stored in DRAM buffer memory 38, so that only a center subset of the image data provided from the image sensor 12 is processed by image processor 50 and stored on removable memory card 54. For example, and as shown in FIG. 18A, the vertical margins 18b of the image may be continuously adjusted, from the normal 16:9 aspect ratio to a wider aspect ratio image, by pressing on the wide control section of the zoom button 42c. In response, the top and bottom of the image in DRAM buffer memory 38 is cropped by image processor 50 to produce increasingly wider aspect ratios, such as 17:9, 18:9 (2:1), 19:9, etc. image aspect ratios. Alternatively, the horizontal margins 18a of the image may be adjusted, from the normal 16:9 aspect ratio to a narrower aspect ratio image by instead pressing on the telephoto control section of the zoom button 42c. In response, the left and right sides of the image in DRAM buffer memory 38 are cropped by image processor 50 to produce increasingly narrower aspect ratios, such as 15:9, 14:9, 3:2, etc. image aspect ratios. In this manner, a variable panoramic effect may be digitally effected using the image data from the first image sensor 12.

Figure 3:
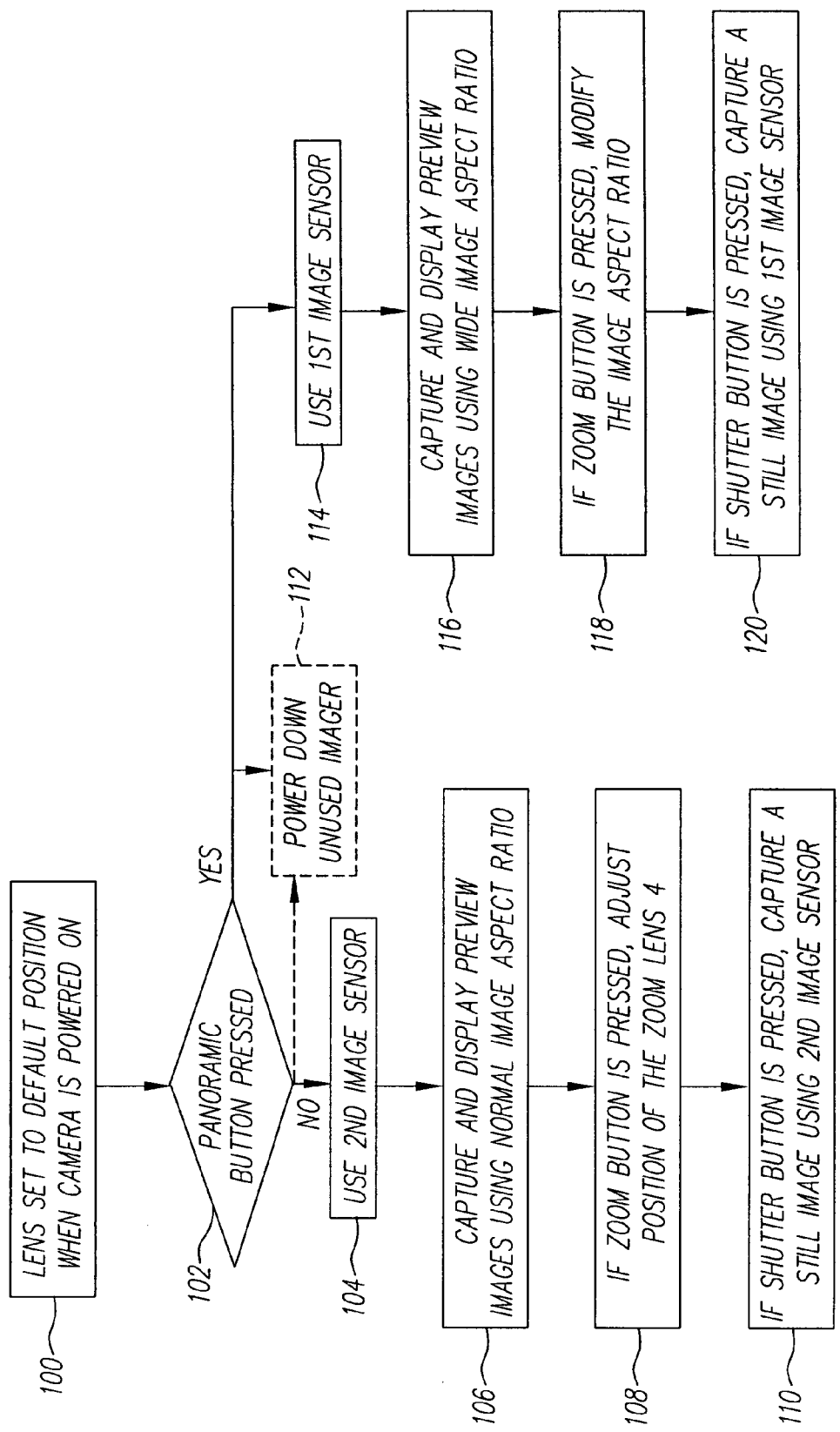
FIG. 3 depicts a flow diagram showing a method for capturing digital images using the digital camera shown in FIG. 1.

FIG. 3 depicts a flow diagram showing a method for capturing digital images using the digital camera of FIG. 1. In lens setting block 100, when the camera 10A is turned on using a power switch (not shown), the zoom lens 3 is set to a default position, which is preferably a wide angle position (e.g., the 38 mm position). In panoramic decision block 102, if the user presses the panoramic button 42b (i.e., a yes response to block 102), the control processor and timing generator 40 controls the analog multiplexer 34 to use (first sensor block 114) the output of the analog signal processor (ASP 1) 22, so that the output of the first image sensor 12 is provided to the A/D converter 36. Thereupon, a preview image from the image sensor 12 is captured and displayed in preview block 116. If the zoom button is pressed at this point (having specified that the wide angle image is being used), the aspect ratio of the image is modified in the aspect ratio adjustment block 118 so as to obtain a variable panoramic effect from the wide angle of the lens 2. Then, if the shutter button is pressed, a still image is captured in capture block 120 using the output of the first sensor 12.

In panoramic decision block 102, if the user does not press the panoramic button 42b (i.e., a no response to block 102), the control processor and timing generator 40 controls the analog multiplexer 34 to use (second sensor block 104) the output of the analog signal processor (ASP2) 24, so that the output of the second image sensor 14 is provided to A/D converter 36. Thereupon, a preview image from the image sensor 14 is captured and displayed in preview block 106. If the zoom button is pressed at this point (having specified that the zoom image is being used), the position of the zoom lens is adjusted in the zoom adjustment block 108 so as to obtain a zooming effect from the minimum focal length to the maximum focal length of the zoom lens 3. Then, if the shutter button is pressed, a still image is captured in capture block 110 using the output of the second sensor 14.

In a further variation on this embodiment, after the panoramic button 42b is pressed (having thus specified that the wide angle image is being used) or if the zoom button 42c is pressed without first pressing the panoramic button 42b (having thus specified that the zoom image is being used), the image sensor that is not being used may optionally be powered down (in the power down block 112) to reduce the power drain and conserve the battery supply.

Figure 4:
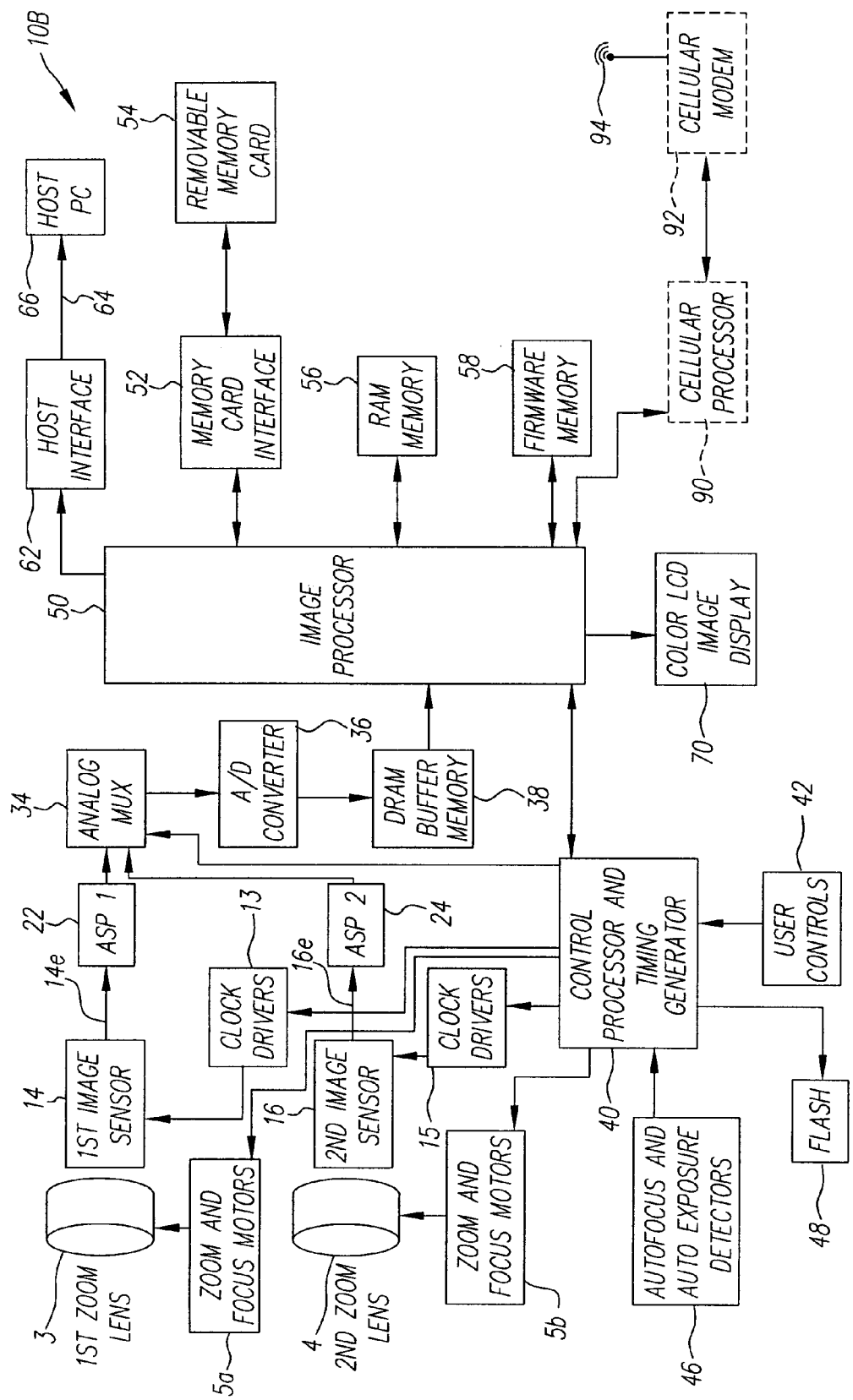
FIG. 4 depicts a block diagram of a second embodiment of a digital camera using a first zoom lens with a first image sensor, and a second zoom lens with a second image sensor.

FIG. 4 depicts a block diagram of a digital camera 10A, which utilizes the second embodiment of the present invention. In the second embodiment, a digital camera 10B includes two zoom lenses, each providing an image to a corresponding image sensor. The first zoom lens 3 is controlled by zoom and focus motors 5a, and provides an image to the first image sensor 14. The second zoom lens 4 is controlled by zoom and focus motors 5b, and provides an image to the second image sensor 16. A user zoom control on the camera selects, depending on its setting, either the output 14e of the first image sensor 14 or the output 16e of the second image sensor 16. The remaining aspects of the digital camera 10B are similar to the digital camera 10A shown in FIG. 1, and retain the same reference characters. Reference is therefore made to FIG. 1 for further description of these aspects of the digital camera 10B.

Figure 5A:
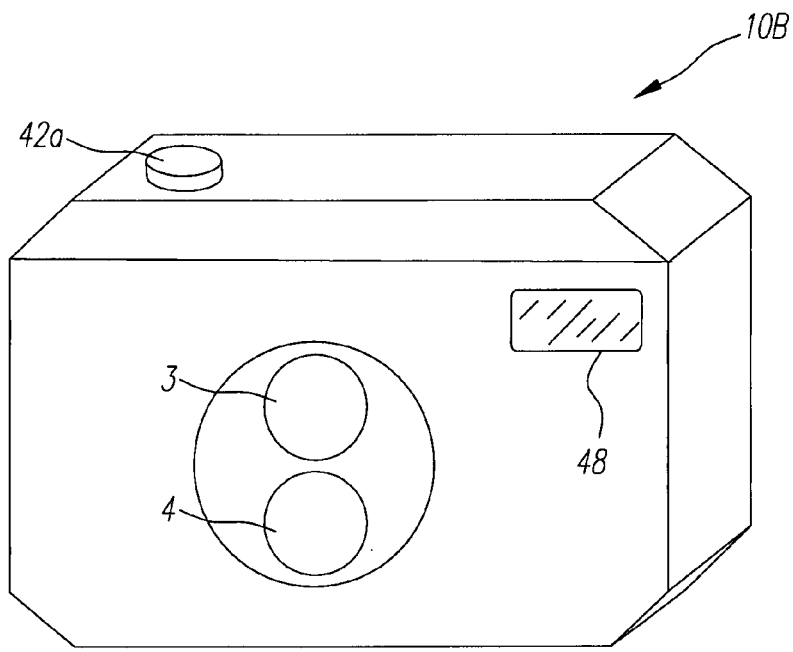
FIGS. 5A and 5B are two perspective views of the digital camera shown in FIG. 4.
Figure 5B:
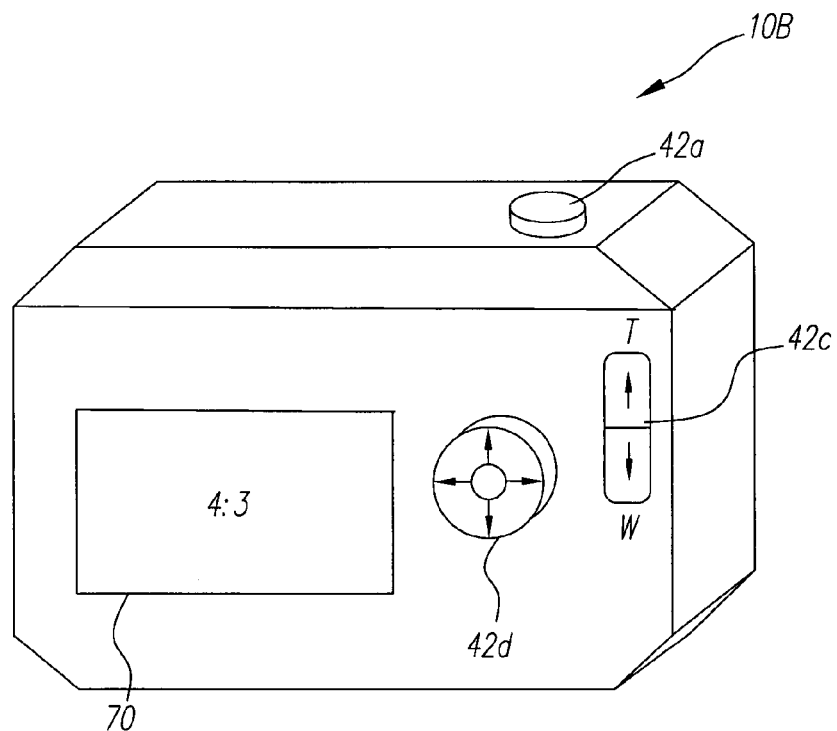

FIGS. 5A and 5B show perspective views of the digital camera 10B described in relation to FIG. 4. FIG. 5A is a front view of the camera 10B, showing the first zoom lens 3, the second zoom lens 4 and the flash 48. The first zoom lens 3 is preferably an ultra-thin lens, e.g., a prism lens; a suitable zoom would be an approximately 3:1 zoom ratio lens, such as a 38-114 mm equiv. focal length zoom lens. The second zoom lens 4 is preferably another ultra-thin lens, e.g., a prism lens; a suitable zoom would be an approximately 3:1 zoom ratio lens, such as a 133-380 mm equiv. focal length zoom lens. Preferably a total zoom ratio of approximately 10:1 may be obtained from the usage of both of the zoom lens. Furthermore, in a preferred embodiment, and since the motorized zooming is typically done between discrete zoom steps rather than continuously, the small gap in focal length between first zoom lens 3 and the second zoom lens 4 is equivalent to a focal length zoom step. Clearly, other lens focal lengths and lens type constructions are within the scope of the invention.

FIG. 5B is a rear view of the camera 10B, and similar in all respects, except for the lack of the panoramic button 42b, to FIG. 2B. Since neither imager has a panoramic aspect ratio, the display 70 is preferably a 4:3 aspect ratio display.

Figure 6:
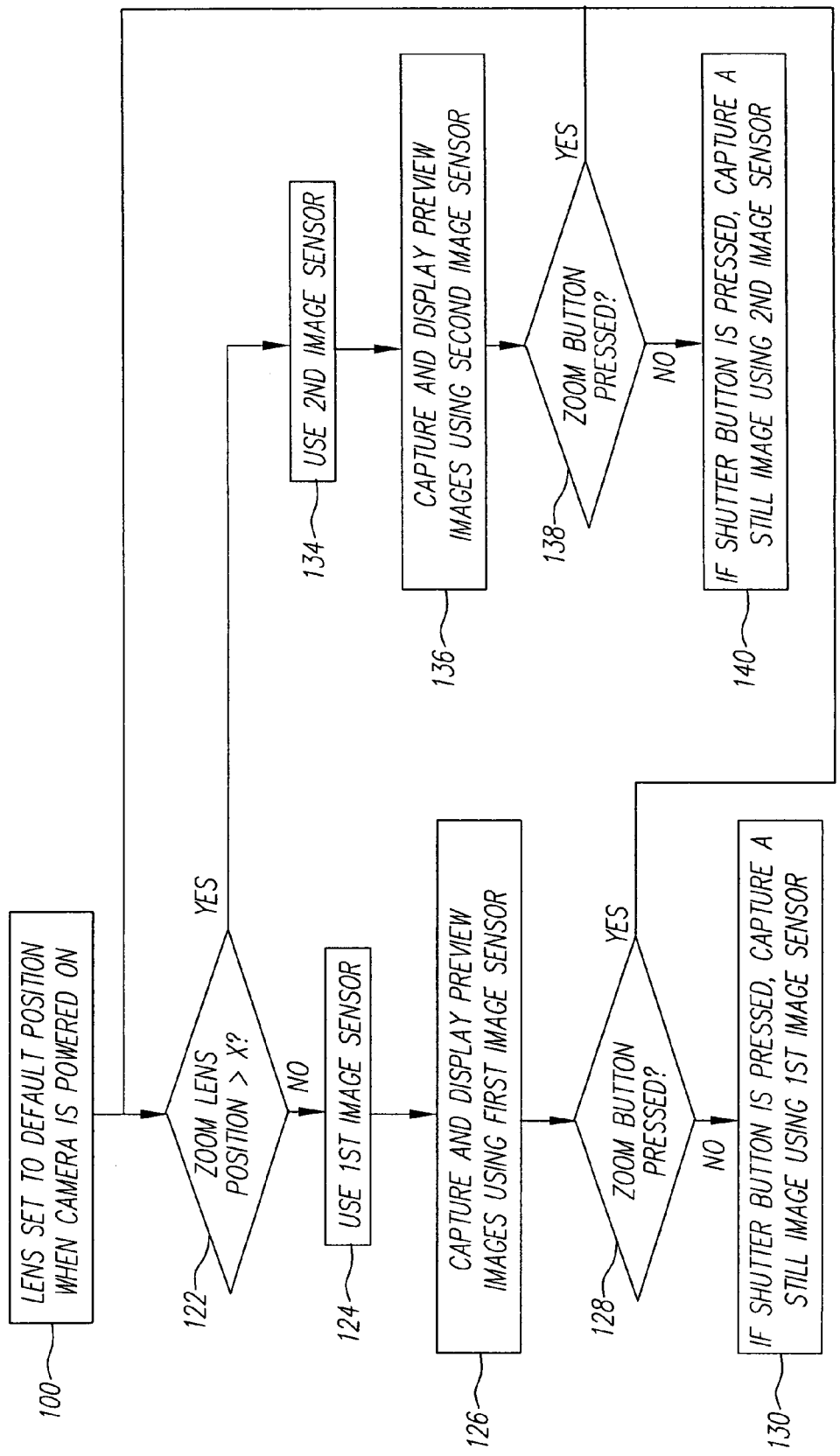
FIG. 6 depicts a flow diagram showing a method for capturing digital images using the digital camera shown in FIG. 4.

FIG. 6 depicts a flow diagram showing a method for capturing digital images using the digital camera of FIG. 4. In lens setting block 100, when the camera 10B is turned on using a power switch (not shown), the first zoom lens 3 is set to a default position, which is preferably a wide angle position (e.g., the 38 mm position).

In zoom position block 122, if the user presses the zoom button 42c and obtains a position beyond X (i.e., something greater than 125 mm and therefore a yes response to block 122), the control processor and timing generator 40 controls the analog multiplexer 34 to use (second sensor block 134) the output of the analog signal processor (ASP 1) 24, so that the output of the second image sensor 16 is provided to the A/D converter 36. Thereupon, a preview image from the image sensor 16 is captured and displayed in preview block 136. Then, if the shutter button is pressed, a still image is captured in capture block 140 using the output of the second sensor 16. If the zoom button is pressed at this point in the zoom button block 138, control is returned to the zoom position block 122.

In zoom position block 122, if the user presses the zoom button 42c and obtains a position less than a position X (i.e., something less than 125 mm and therefore a no response to block 122), the control processor and timing generator 40 controls the analog multiplexer 34 to use (first sensor block 124) the output of the analog signal processor (ASP2) 22, so that the output of the first image sensor 14 is provided to the A/D converter 36. Thereupon, a preview image from the image sensor 14 is captured and displayed in preview block 126. Then, if the shutter button 42a is pressed, a still image is captured in capture block 130 using the output of the first sensor 16. If the zoom button is pressed at this point in the zoom button block 128, control is returned to the zoom position block 122, and the process is repeated.

Figure 7:
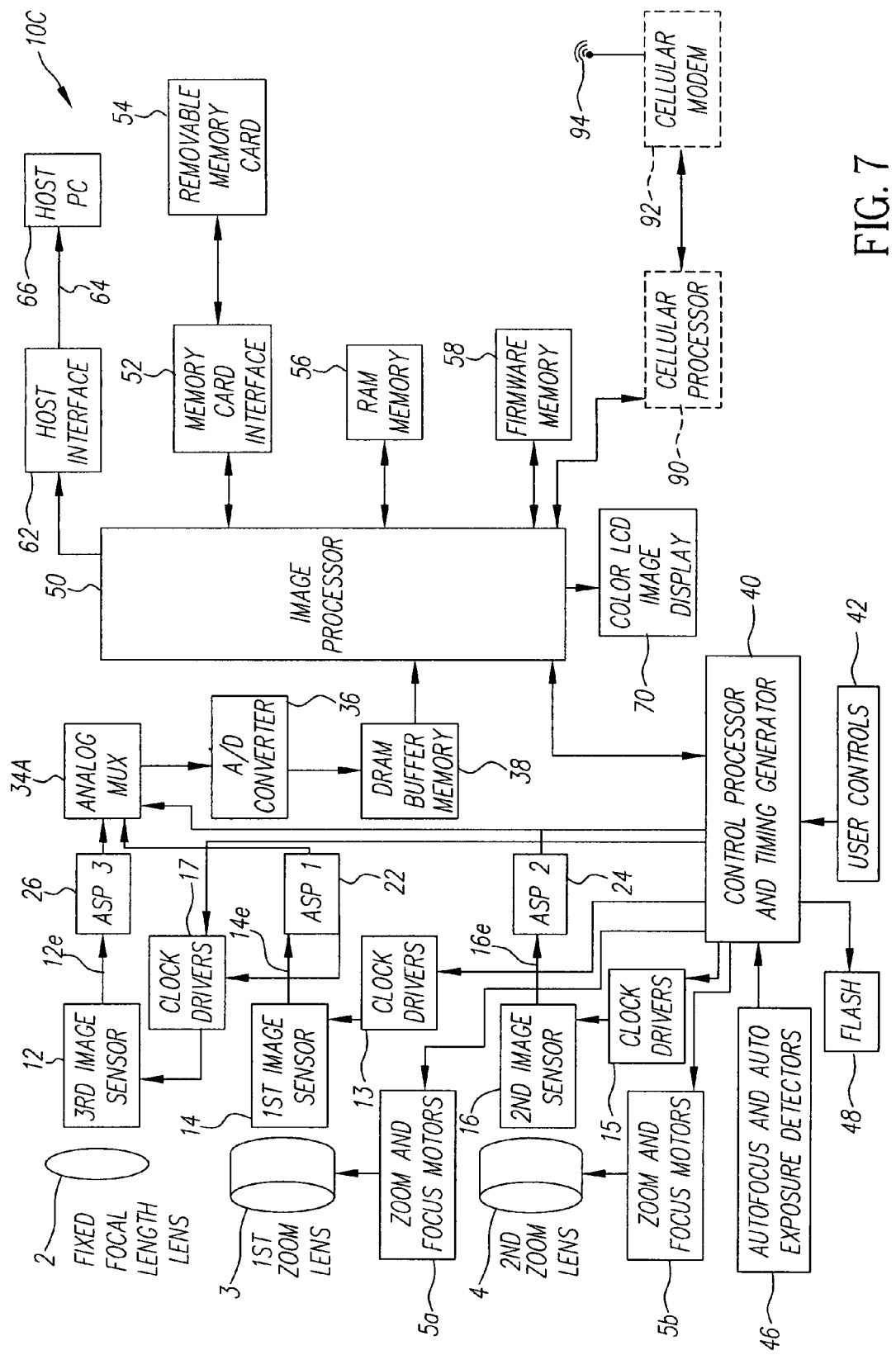
FIG. 7 depicts a block diagram of a third embodiment of a digital camera using a first zoom lens with a first image sensor, a second zoom lens with a second image sensor and a fixed focal length lens with a third image sensor.

FIG. 7 depicts a block diagram of a digital camera 10C, which utilizes the third embodiment of the present invention. In the third embodiment, a digital camera 10C includes two zoom lenses 3 and 4 and a fixed focal length lens 2, each providing an image to a corresponding image sensor. The first zoom lens 3 is controlled by zoom and focus motors 5a, and provides an image to the first image sensor 14. The second zoom lens 4 is controlled by zoom and focus motors 5b, and provides an image to the second image sensor 16. The fixed focal length lens 2 provides an image to the third image sensor 12. A user zoom control on the camera selects, depending on its setting, either the output 14e of the first image sensor 14, the output 16e of the second image sensor 16, or the output 12e of the third image sensor 12. The remaining aspects of the digital camera 10C are similar to the digital camera 10B shown in FIG. 4, and retain the same reference characters. Reference is therefore made to FIG. 4 for further description of these aspects of the digital camera 10C.

Figure 8A:
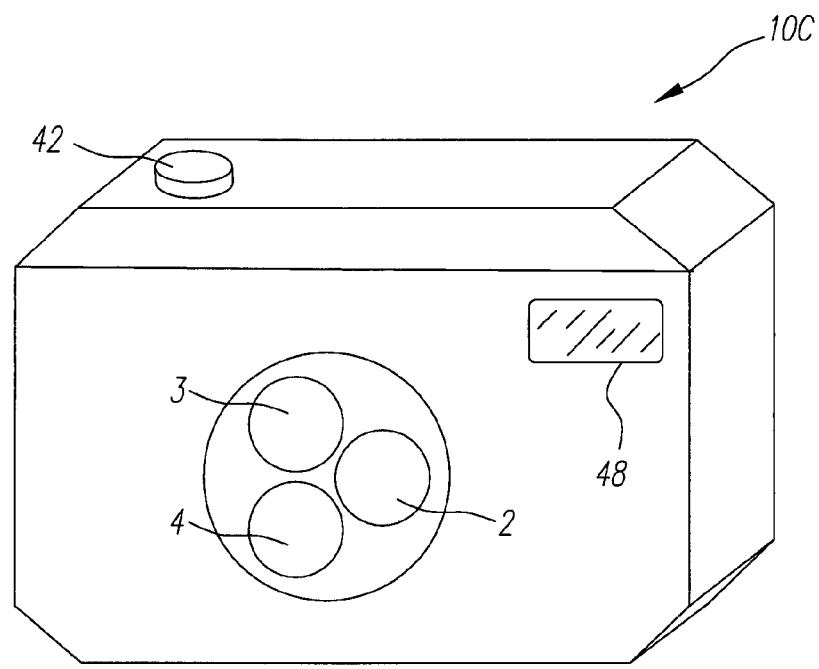
FIGS. 8A and 8B are two perspective views of the digital camera shown in FIG. 7.
Figure 8B:
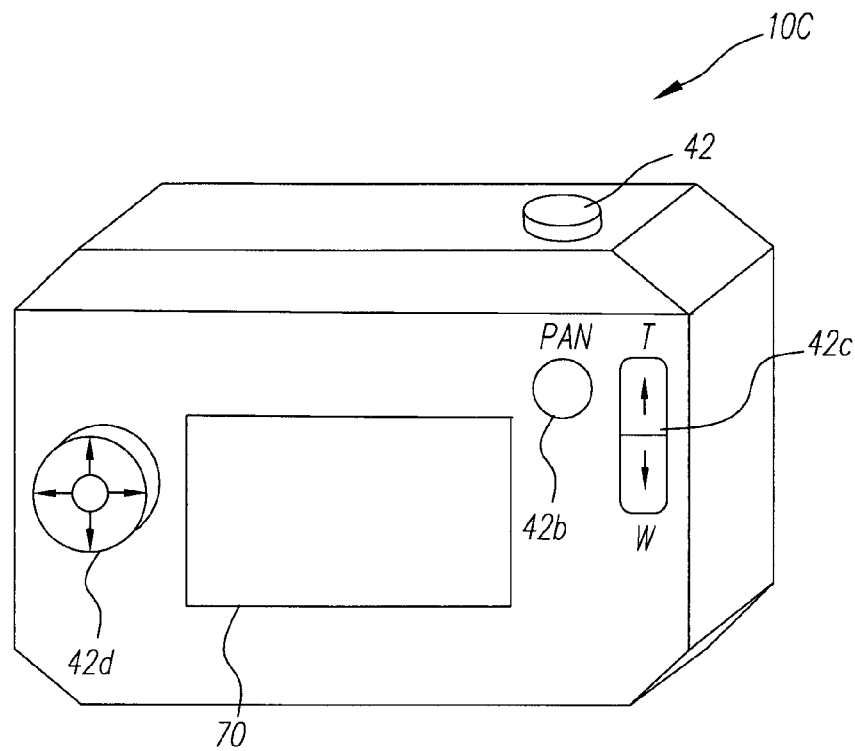

FIGS. 8A and 8B show perspective views of the digital camera 10C described in relation to FIG. 7. FIG. 8A is a frontal view of the camera 10C, showing the first zoom 3, the second zoom lens 4, the fixed focal length lens 2 and the flash 48. The first zoom lens 3 is preferably an ultra-thin lens, e.g., a prism lens; a suitable zoom would be an approximately 3:1 zoom ratio lens, such as a 38-114 mm equiv. focal length zoom lens. The second zoom lens 4 is preferably another ultra-thin lens, e.g., a prism lens; a suitable zoom would be an approximately 3:1 zoom ratio lens, such as a 133-380 mm equiv. focal length zoom lens. Preferably a total zoom ratio of approximately 10:1 may be obtained from the usage of both of the zoom lens. Furthermore, in a preferred embodiment, the small gap in focal length between first zoom lens 3 and the second zoom lens 4 is equivalent to a focal length zoom step. The fixed focal length lens is preferably an ultra wide angle lens; a suitable lens has a 22 mm equiv. focal length and an f/2 maximum aperture. Clearly, other lens focal lengths and lens type constructions are within the scope of the invention.

FIG. 8B is a rear view of the camera 10C, and similar in all respects to FIG. 2B. In a further (optional) variation of the third embodiment, the aspect ratio (e.g., 16:9) of the image provided by the fixed focal length lens 2 may be different than the aspect ratio of the image provided by the zoom lenses 3 or 4. In this case, as was shown in FIG. 2B, the user control 42 (e.g., the zoom button 42c) may input user commands for changing the aspect ratio of the image sensor 2 in order to obtain a variable panoramic effect that transitions from the wide angle of the lens 2 toward a narrower angle approaching the effect of the 4:3 aspect ratio of the zoom lens 3.

Figure 9:
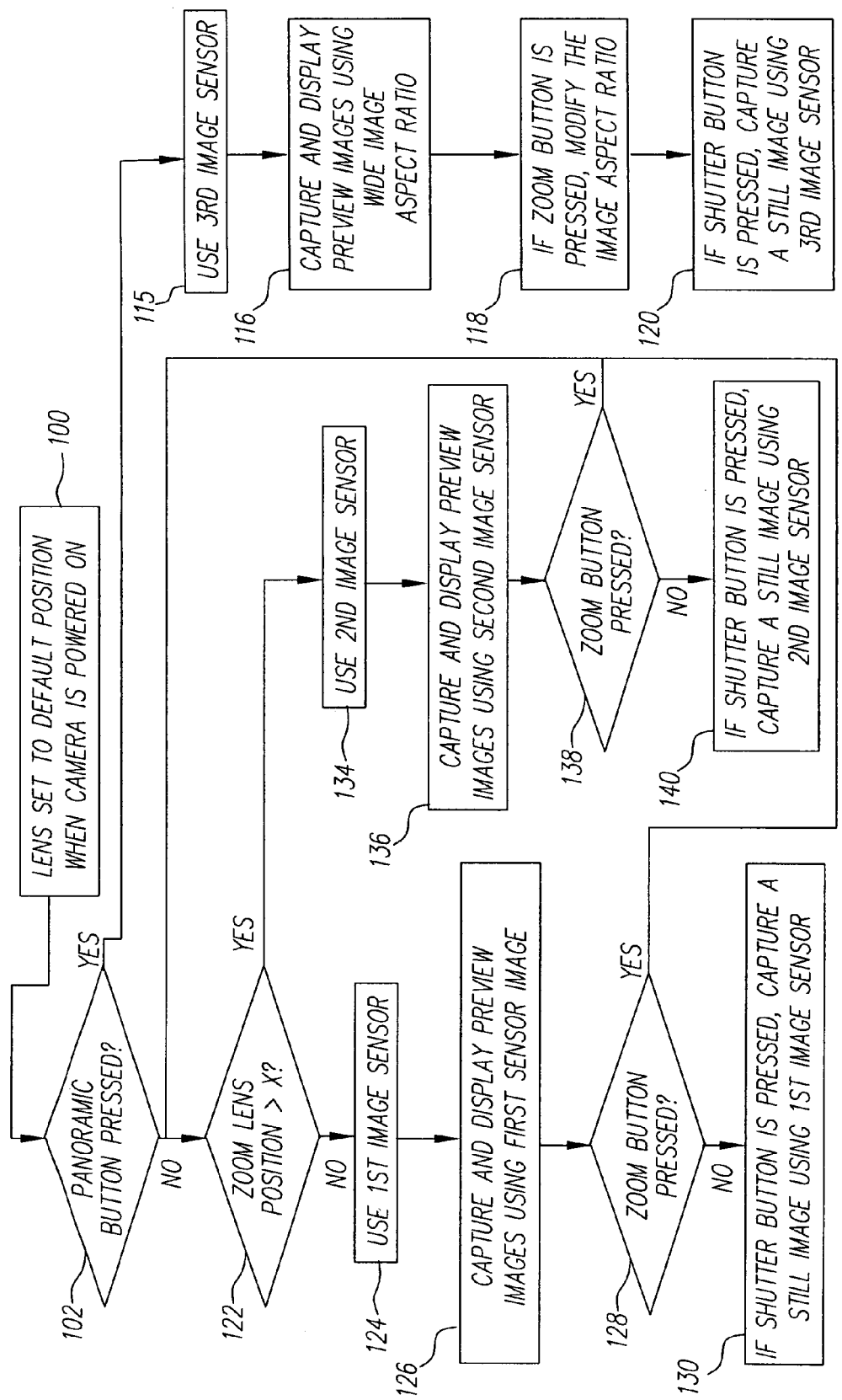
FIG. 9 depicts a flow diagram showing a method for capturing digital images using the digital camera shown in FIG. 7.

FIG. 9 depicts a flow diagram showing a method for capturing digital images using the digital camera of FIG. 7. This figure is mostly a composite of the blocks in FIGS. 3 and 6, and most of the blocks retain the same reference characters for the same block functions and steps. In lens setting block 100, when the camera 10B is turned on using a power switch (not shown), the first and second zoom lenses 3 and 4 are set to default positions, which are preferably the wide angle position of each lens (e.g., the 38 mm position for lens 3 and the 125 mm position for lens 4).

In panoramic decision block 102, if the user presses the panoramic button 42b (i.e., a yes response to block 102), the control processor and timing generator 40 controls the analog multiplexer 34 to use (third sensor block 115) the output of the analog signal processor (ASP1) 26, so that the output of the third image sensor 12 is provided to the A/D converter 36. Thereupon, a preview image from the image sensor 12 is captured and displayed in preview block 116. If the zoom button is pressed at this point (having specified that the wide angle image is being used), the aspect ratio of the image is modified in the aspect ratio adjustment block 118 so as to obtain a variable panoramic effect from the wide angle of the lens 2. Then, if the shutter button is pressed, a still image is captured in capture block 120 using the output of the third sensor 12.

If the panoramic decision block 102 is not engaged (i.e., the user has not pressed the panoramic button 42b), control is transferred to the zoom position block 122. In zoom position block 122, if the user presses the zoom button 42c and obtains a position beyond X (i.e., something greater than 125 mm and therefore a yes response to block 122), the control processor and timing generator 40 controls the analog multiplexer 34 to use (second sensor block 134) the output of the analog signal processor (ASP1) 24, so that the output of the second image sensor 16 is provided to the A/D converter 36. Thereupon, a preview image from the image sensor 16 is captured and displayed in preview block 136. Then, if the shutter button is pressed, a still image is captured in capture block 140 using the output of the second sensor 16. If the zoom button is pressed at this point in the zoom button block 138, control is returned to the zoom position block 122.

In zoom position block 122, if the user presses the zoom button 42c and obtains a position less than a position X (i.e., something less than 125 mm and therefore a no response to block 122), the control processor and timing generator 40 controls the analog multiplexer 34 to use (first sensor block 124) the output of the analog signal processor (ASP2) 27, so that the output of the first image sensor 14 is provided to the A/D converter 36. Thereupon, a preview image from the image sensor 14 is captured and displayed in preview block 126. Then, if the shutter button 42a is pressed, a still image is captured in capture block 130 using the output of the first sensor 16. If the zoom button is pressed at this point in the zoom button block 128, control is returned to the zoom position block 122, and the process is repeated.

Figure 19:
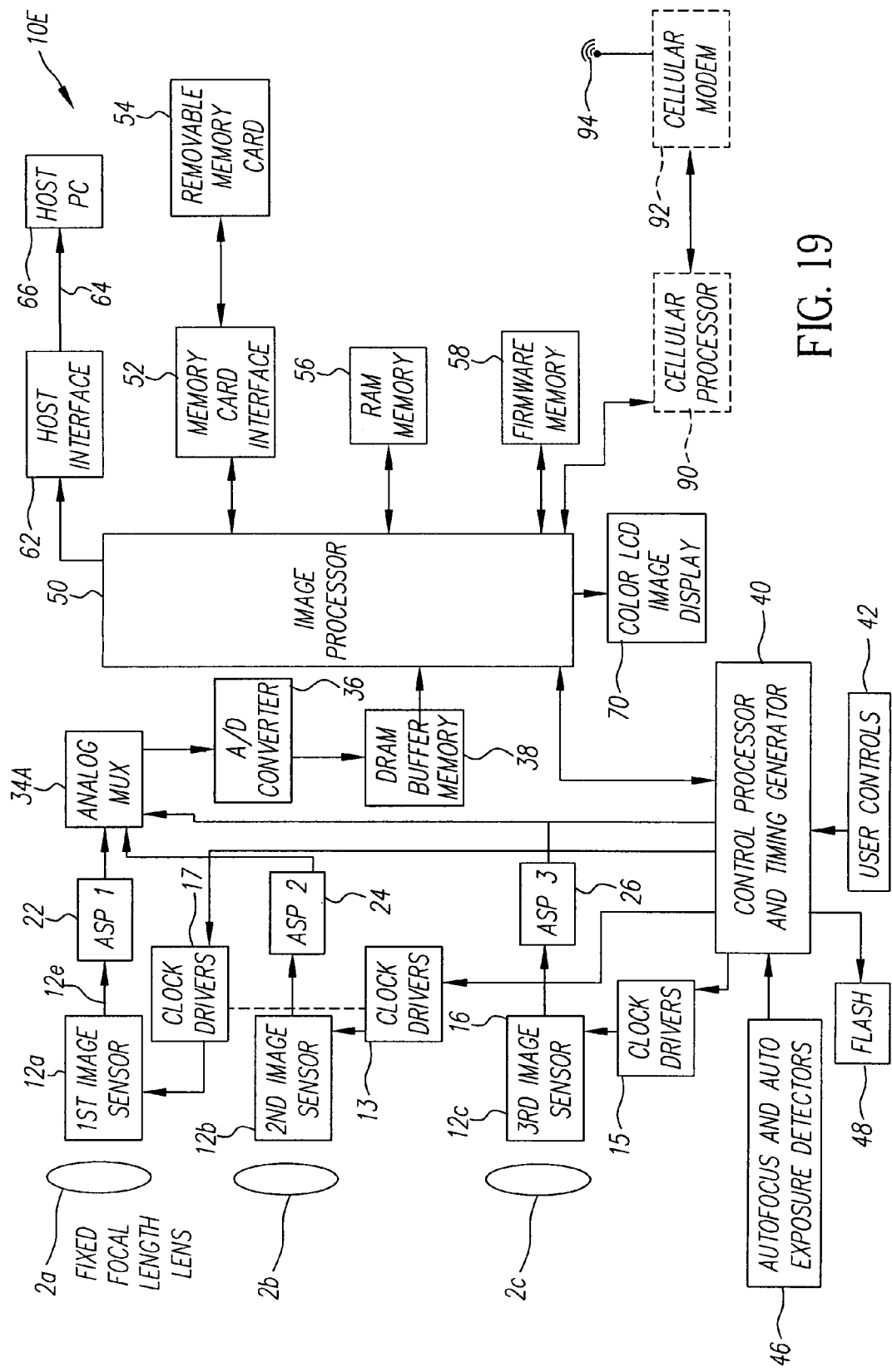
FIG. 19 depicts a block diagram of a further embodiment of a digital camera using a first fixed focal length lens with a first sensor, a second fixed focal length lens with a second sensor, and a third fixed focal length lens with a third sensor.

FIG. 19 represents the fourth and fifth embodiments of the invention, where a digital camera 10D includes two (the fourth embodiment) fixed focal length lenses or a digital camera 10E includes three (the fifth embodiment) fixed focal length lenses, each providing an image to a corresponding imaging array. FIG. 19 specifically depicts a block diagram of a digital camera 10E according to the fifth embodiment of the present invention. In the fifth embodiment, a digital camera 10E includes three fixed focal length lens, each providing an image to a corresponding image sensor. The first fixed focal length lens 2a provides an image to the first image sensor 12a. The second fixed focal length lens 2b provides an image to the second image sensor 12b. The third fixed focal length lens 2c provides an image to the third image sensor 12c. A user zoom control on the camera selects, depending on its setting, either the output of the first image sensor 12a, the output of the second image sensor 12b, or the output of the third image sensor 12c. More specifically, the user zoom control on the camera selects either the output of one of the three image sensors to provide a rough magnification setting, and in addition uses a digital zoom provided by the image processor 50 to provide fine magnification control. For example, the first focal length lens 2a may have a focal length of 30 mm equiv. (35 mm equivalent), the second fixed focal length 2b lens may have a focal length of 90 mm equiv., and the third fixed focal length lens 2c may have a focal length of 135 mm equiv. The zoom lens control may provide settings from 30 mm to 270 mm. When the user selects 60 mm, for example, the output from the first sensor 12a is selected, along with a 2× digital zoom. When the user selects 270 mm, the output of the third sensor 12c is selected, along with 2× digital zoom.

In the fourth embodiment, a digital camera 10D includes two fixed focal length lens, each providing an image to a corresponding image sensor. Consequently, for the fourth embodiment, FIG. 19 is modified such that the third fixed focal length lens 2c, and its ancillary components and circuitry, is eliminated. A user zoom control on the camera selects, depending on its setting, either the output of the first image sensor 12a, or the output of the second image sensor 12b. For example, the first focal length lens 2a may have a focal length of 30 mm equiv. (35 mm equivalent), and the second fixed focal length 2b lens may have a focal length of 90 mm equiv. The zoom lens control 42c may provide settings from 30 mm to 270 mm. When the user selects 60 mm, for example, the output from the first sensor 12a is selected, along with a 2x digital zoom. When the user selects 270 mm, the output of the second sensor 12b is selected, along with 3x digital zoom. The remaining aspects of the digital cameras 10D and 10E are similar to the digital camera 10B shown in FIG. 4, and retain the same reference characters. Reference is therefore made to FIG. 4 for further description of these aspects of the digital cameras 10D and 10E.

The perspective views of digital cameras 10D and 10E are not shown, as they are substantially similar to the perspective views of FIGS. 5A and 5B, except that another optical relay subassembly is included for the digital camera 10E.

Figure 20:
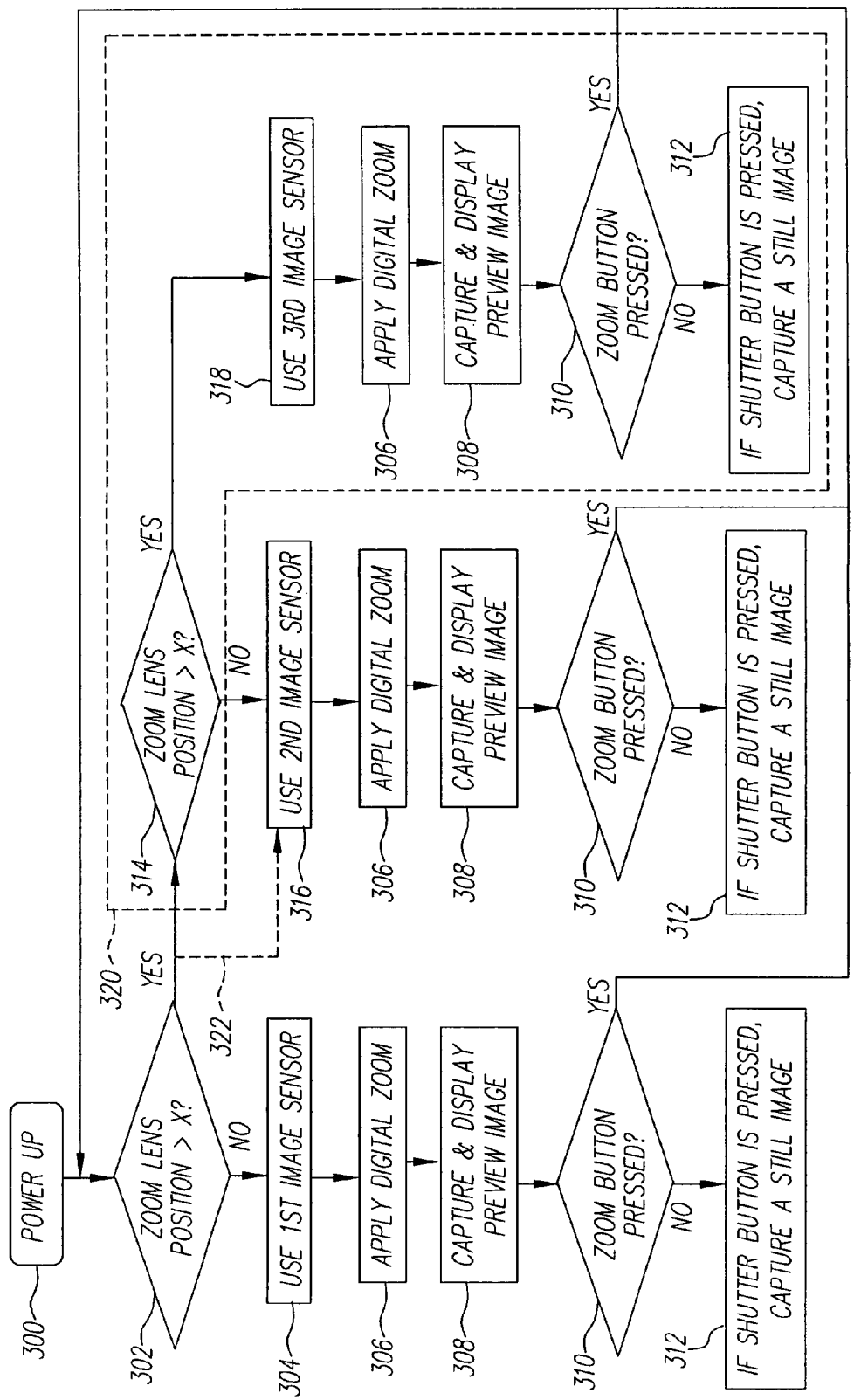
FIG. 20 depicts a flow diagram showing a method for capturing digital images using the digital camera shown in FIG. 19.

FIG. 20 depicts a flow diagram showing a method for capturing digital images using the digital camera 10E of FIG. 20. In a power up block 300, the camera 10E is turned on using a power switch (not shown). In zoom position block 302, if the user presses the zoom button 42c and obtains a position beyond X (e.g., something equal to or greater than 90 mm equiv. and therefore a yes response to block 302), control is transferred to the second zoom position block 314. There, if the zoom button 42c is indicating a position beyond Y (e.g., something equal to or greater than 135 mm equiv. and therefore a yes response to block 314), the control processor and timing generator 40 controls the analog multiplexer 34 to use (third sensor block 318) the output of the analog signal processor (ASP3) 26, so that the output of the third image sensor 12c is provided to the A/D converter 36. If the zoom control 42c is requesting a focal length other than the optical 135 mm equiv., digital zoom is applied to the image in the zoom block 306 to bring the image up to the requested focal length. Thereupon, a preview image from the image sensor 12c is captured and displayed in preview block 308. Then, if the shutter button is pressed, a still image is captured in capture block 312 using the output of the third sensor 12c. If the zoom button is pressed at this point in the zoom button block 310, control is instead returned to the zoom position block 302.

If the zoom button 42c is indicating a position less than Y (i.e., something less than 135 mm equiv. and therefore a no response to block 314), the control processor and timing generator 40 controls the analog multiplexer 34 to use (second sensor block 316) the output of the analog signal processor (ASP2) 24, so that the output of the second image sensor 12b is provided to the A/D converter 36. If the zoom control 42c is requesting a focal length other than the optical 90 mm equiv., digital zoom is applied to the image in the zoom block 306 to bring the image up to the requested focal length. Thereupon, a preview image from the image sensor 12b is captured and displayed in preview block 308. Then, if the shutter button is pressed, a still image is captured in capture block 312 using the output of the second sensor 12b. If the zoom button is pressed at this point in the zoom button block 310, control is instead returned to the zoom position block 302.

In zoom position block 302, if the user presses the zoom button 42c and obtains a position less than a position X (i.e., something less than 90 and therefore a no response to block 302), the control processor and timing generator 40 controls the analog multiplexer 34 to use (first sensor block 304) the output of the analog signal processor (ASP1) 22, so that the output of the first image sensor 12a is provided to the A/D converter 36. If the zoom control 42c is requesting a focal length other than the optical 30 mm equiv., digital zoom is applied to the image in the zoom block 306 to bring the image up to the requested focal length. Thereupon, a preview image from the image sensor 12a is captured and displayed in preview block 308. Then, if the shutter button 42a is pressed, a still image is captured in capture block 312 using the output of the first sensor 12a. If the zoom button is pressed at this point in the zoom button block 310, control is returned to the zoom position block 302, and the process is repeated.

A number of advantages may be obtained by use of the fixed focal length lenses in the fourth and fifth embodiments. The aperture of each lens can be kept quite large (e.g., f/2.8 at least for the widest angle lens), thereby providing a high speed, low light lens. In addition, the image quality can be kept higher than for a comparable zoom lens. When digital zooming is employed, there are no moving parts for the zoom—even though there are two (or three) optical settings—and the zoom is completely silent and relatively fast in zoom focal length transitions.

In the sixth embodiment (which is not shown as a separate block diagram), a digital camera 10F includes four fixed focal length lenses, each providing an image to a corresponding image sensor. Consequently, for the sixth embodiment, FIG. 19 is modified such that a fourth fixed focal length lens 2d, and its ancillary components and circuitry, is added. A user zoom control on the camera selects, depending on its setting, either the output of the first image sensor 12a, the output of the second image sensor 12b, the output of the third sensor 12c, or the output of the fourth sensor 12d. For example, the first focal length lens 2a may have a focal length of 30 mm equiv. (35 mm equivalent), and the second fixed focal length 2b lens may have a focal length of 60 mm equiv., the third fixed focal length 2b lens may have a focal length of 120 mm equiv., and the fourth fixed focal length 2b lens may have a focal length of 270 mm equiv. The zoom lens control 42c may provide settings from 30 mm to 400 mm. When the user selects 45 mm, for example, the output from the first sensor 12a is selected, along with a 1.5x digital zoom. When the user selects 90 mm, for example, the output from the second sensor 12b is selected, along with a 1.5x digital zoom. When the user selects 240 mm, for example, the output from the third sensor 12c is selected, along with a 2x digital zoom. When the user selects 400 mm, the output of the fourth sensor 12d is selected, along with 1.5x digital zoom. The remaining aspects of the digital camera 10F are similar to the digital camera 10E shown in FIG. 19, and reference is therefore made to FIG. 19 for further description of these aspects of the digital camera. The perspective views and flow diagram of the digital camera 10F are not shown, as they are substantially similar to the perspective views of FIGS. 5A and 5B and the flow diagram of FIG. 20, except that yet another optical relay subassembly, and another flow column in FIG. 20 for the fourth sensor 12c, is included for the digital camera 10F.

In many of the foregoing embodiments, digital zooming is used. Digital zooming is a well-known process and any of a variety of techniques may be used. One such digital zooming capability is described in commonly-assigned pending U.S. Patent Application Publication No. 2003/0202113, "Electronic Still Camera and Image Processing Method" filed on Aug. 1, 2002 in the name of Sumito Yoshikawa and which is incorporated herein by reference. For the type of system disclosed in this pending patent application, as well as for the system according to the present invention, the image sensor includes an array of discrete light sensitive picture elements overlaid with a color filter array (CFA) pattern to produce color image data corresponding to the CFA pattern. The output data from the image sensor is applied to an analog signal processing (ASP) and analog/digital (A/D) conversion section, which produces digital CFA data from the color image data.

The resultant digital data is applied to a digital signal processor, such as the image processor 50 (referring to FIG. 1 of the present disclosure), which interpolates red, green, and blue (RGB) color image data for all of the pixels of the color image sensor. The CFA image data represents an image of a fixed size, such as 2048 columns of pixels×1536 rows of pixels. A digitally zoomed image is provided by taking the center section of the CFA image data and interpolating additional pixels that fall in between the pixels provided by the image sensor. For example, a 2:1 digital zoom is provided by using only the center 1024 columns×768 rows of the CFA image data, and by interpolating one additional row and column in between each of the rows and columns of the center CFA image data, so as to enlarge the center of the image. The output of the image processor 50 is a color interpolated and digitally zoomed image, with 2048 columns and 1536 rows of RGB data, provided from the center 1024 columns×768 rows of CFA image data.

In operation of the present imaging system according to the aforementioned Yoshikawa patent disclosure, the user operates the digital camera, e.g., the digital camera 10E (FIG. 19), to take pictures while observing the image on the color LCD image display 70. The digital CFA image for each of the captured images is processed by the image processor 50 and displayed in a "thumbnail" or subsampled format in the preview step (e.g., steps 308 in FIG. 20). If the observed zoom amount is not desired, the user then changes the zooming/cropping setting in a zoom selection/cropping step (e.g., steps 302, 314 in FIG. 20) by using the zoom button 42c. The amount of digital zooming is determined by the control processor and timing generator 40 and provided to the image processor 50. The control processor and timing generator 40 selects which of the image sensor outputs to use (by controlling the analog mux 34), and the amount of digital zoom needed, which in combination provide the desired overall zoom setting. For example, a 2.5:1 overall zoom setting can be provided by selecting (using the analog mux 34) a lens and image sensor that provides a 2:1 optical zoom and also instructing the image processor 50 to provide a 5:4 digital zoom setting, which uses the center 1638 columns×1230 rows (from the 2048 columns×1536 rows of CFA image data).

Figure 21:
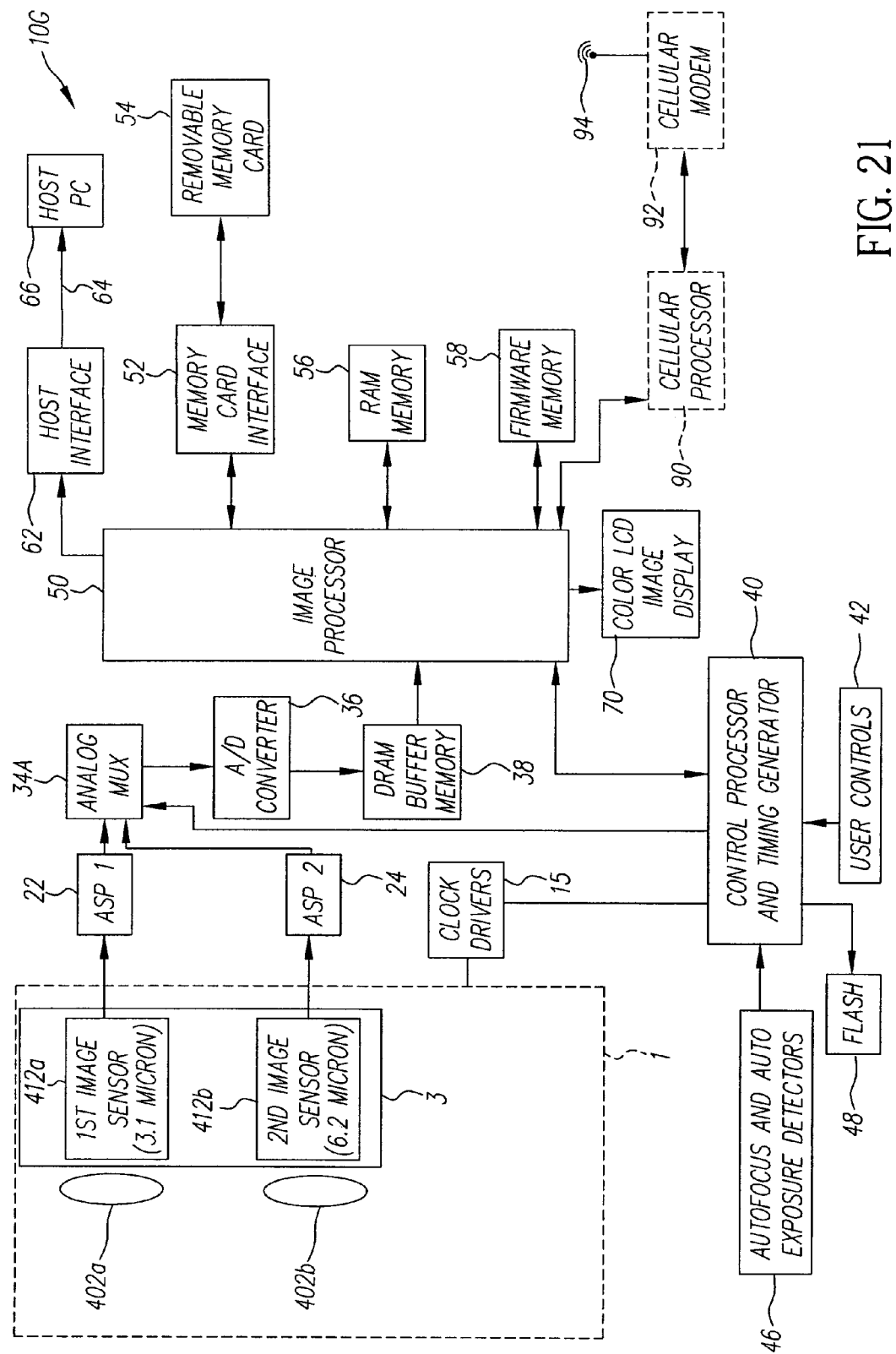
FIG. 21 depicts a block diagram of a further embodiment of a digital camera using a first lens with a first sensor having pixels of one size. e.g., three micron pixels, and a second lens with a second sensor having pixels of another size, e.g., five micron pixels.

In an additional embodiment shown in FIG. 21, the two (or three) lenses have identical focal lengths, and the imaging arrays are different sizes (e.g. both sensors are, e.g., 3.1 effective megapixel sensors with 2048 columns×1536 rows of pixels, but the first image sensor 412a has 3.1 micron square pixels and the second image sensor 412b has 6.2 micron square pixels, so that the diagonal of the second image sensor is twice as large as the first image sensor). With the differently sized imaging arrays, each lens is designed to fill the area of the imaging array and each lens-array combination can have substantially the same actual focal length, i.e., the same lens to array distance. However, the 35 mm equiv. of each lens will be different, in proportion to the difference in the diagonal size of the array; consequently, each lens will have a different field of view. In FIG. 21, in this additional embodiment, a digital camera 10G includes a first fixed focal length lens 402a that provides an image to a first image sensor 412a, which has 3.1 micron pixels. A second fixed focal length lens 402b provides an image to a second image sensor 412b, which has 6.2 micron pixels. A user zoom control 42 on the camera selects, depending on its setting, either the output of the first image sensor 412a or the output of the second image sensor 412b. More specifically, the user zoom control on the camera selects the output of one of the two image sensors to provide a rough magnification setting based on the 35 mm equiv. focal length of the lenses 402a and 402b, and in addition uses a digital zoom provided by the image processor 50 to provide fine magnification control. For example, the first focal length lens 402a may have an actual focal length of 16 mm, which provides a 35 mm equiv. focal length of about 80 mm because the pixels are 3.1 mm so that the diagonal size is about 8 mm. The second fixed focal length 402b lens may also have an actual focal length of 16 mm, but it provides a 35 mm equivalent focal length of about 40 mm, because the pixels are 6.2 mm so that the diagonal size is about 16 mm. The zoom lens control may provide settings from 40 mm to 160 mm. When the user selects 60 mm, for example, the output from the second sensor 412b is selected, along with a 1.5× digital zoom. When the user selects 160 mm, for example, the output of the first sensor 412a is selected, along with 2× digital zoom.

The remaining aspects of the digital cameras 10G are similar to the digital camera 10B shown in FIG. 4, and retain the same reference characters. Reference is therefore made to FIG. 4 for further description of these aspects of the digital camera 10G.

Figure 22:
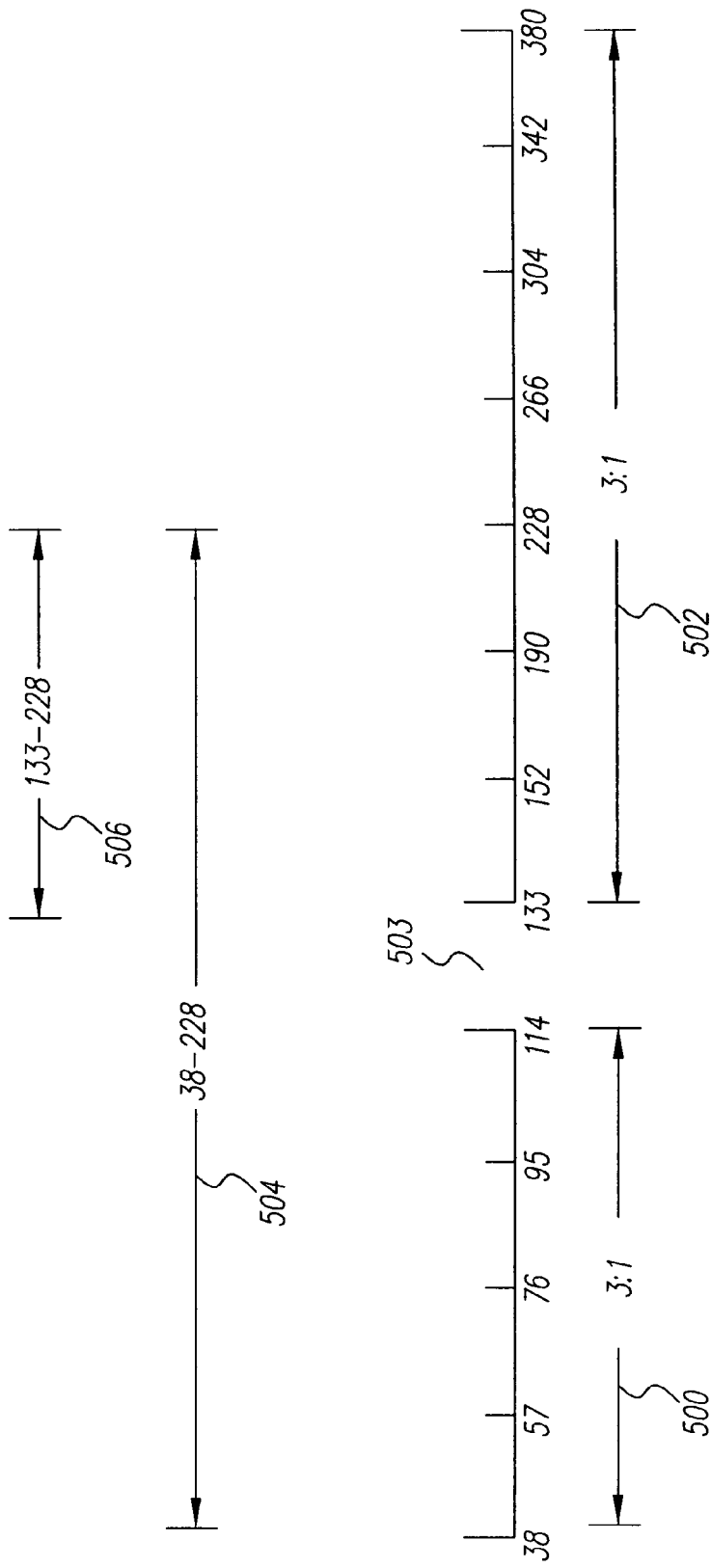
FIG. 22 is a diagram useful for explaining an express zooming feature.

A further advantage of the invention is that use of dual zooms provides an extended optical zoom range in a digital camera where the movement between user-requested zoom positions may be undertaken in an expedited manner. Since motorized zooming is typically done between discrete zoom steps rather than continuously, the full range of a zoom system is divided into a finite number of discrete steps. For example, as shown in FIG. 22, a two zoom system in accordance with the invention may be divided into a first zoom range 500 providing a 38 mm-114 mm equiv. zoom lens range and a second zoom range 502 providing a 133 mm-380 mm equiv. zoom lens range Such an arrangement may be provided by the digital camera 10B shown in FIG. 4. According to this arrangement, the zoom and focus motors 5a and 5b drive the respective zoom lenses 3 and 4 through a finite series of discrete steps, where each step represents, for the example shown in FIG. 22, 0.5× zoom steps over the lower zoom range, and 1× zoom steps over the higher zoom range More particularly, the zoom and focus motor 5a drives the zoom lens 3 from 38 mm to 114 mm in five discrete steps, with the steps corresponding to 1× (38 mm), 1.5× (57 mm), 2× (76 mm), 2.5× (95 mm) and 3× (114 mm) zoom steps. The zoom and focus motor 5b drives the zoom lens 4 from 133 mm to 380 mm in seven discrete steps, with the steps corresponding to 3.5× (133 mm), 4× (152 mm), 5× (190 mm), 6× (228 mm), 7× (266 mm), 8× (304 mm), 9× (342 mm), and 10× (380 mm) zoom steps. The two lenses are separated in focal length by a one step gap 503 (i.e., by 19 mm, corresponding to the 0.5× gap between the 3× zoom focal length and the 3.5× zoom focal length.).

In operation, the user operates the user control 42 in order to select a zoom setting, whereby the zoom and focus motors 5a and 5b are responsive to the user control 42 for adjusting the zoom lenses through the first plurality of discrete zoom positions 500 for the first zoom lens 3 and through the second plurality 502 of discrete zoom positions for the second zoom lens 4. The control processor and timing generator 40, acting as a zoom controller, controls the zoom and focus motors 5a and 5b and enables an express mode when a user initiated change in the user control specifies a zoom transition from a present zoom setting within one of the plurality of discrete zoom positions in one of the ranges to a target zoom setting within the other plurality of discrete zoom positions in the other range. The control processor and timing generator 40 causes the zoom and focus motor of the lens containing the target position to immediately move the corresponding zoom lens to the target zoom position without powering the other zoom and position motor through any intervening discrete zoom positions, thereby enabling an express zooming sequence in which the zoom and focus motors of the lens not containing the target position do not have to traverse all of the intervening zoom positions between the present zoom setting and the target zoom setting.

An example is shown in FIG. 22. In the power up mode, both zoom lenses will be brought to their minimum focal length positions, i.e., the zoom lens 3 will be driven to the 38 mm position and the zoom lens 4 will be driven to the 133 mm position. If the user initially chooses to view a subject at the widest angle position, say 38 mm equiv., the zoom lens 3 will provide its widest angle image to the image sensor 14 (FIG. 4) and the analog multiplexer 34 will select the first image output 14e from the first image sensor 14. If the user then presses the zoom button 42c to a tele position, say 228 mm equiv., the usual response in a single zoom lens that spanned the range from 38 mm to 228 mm would be to drive the zoom lens through an 8 step sequence 504 as shown in FIG. 22. However, in the express mode according to the invention, the control processor and timing generator 40 immediately directs the zoom and focus motor 5b to drive the lens 4 through a 3 step sequence 506 from 133 mm to 228 mm. Meanwhile, the zoom lens 3 remains at its widest setting. Consequently, five steps of movement are saved and the movement between user-requested zoom positions is undertaken in an expedited manner compared to the prior art situations. Clearly, FIG. 22 is only an example, and many other variations of step length and zoom ranges are within the scope of the invention. For example, in power up mode, the lens 4 could be set to the maximum focal length (380 mm) rather than the widest focal length (133 mm). Then the camera could be immediately switched from the wide-angle position (38 mm equiv.) to the maximum telephoto position (380 mm equiv.) immediately, simply by switching the analog mux 34 to provide the output of the $2^{nd}$ image sensor 16.

Figure 23A:
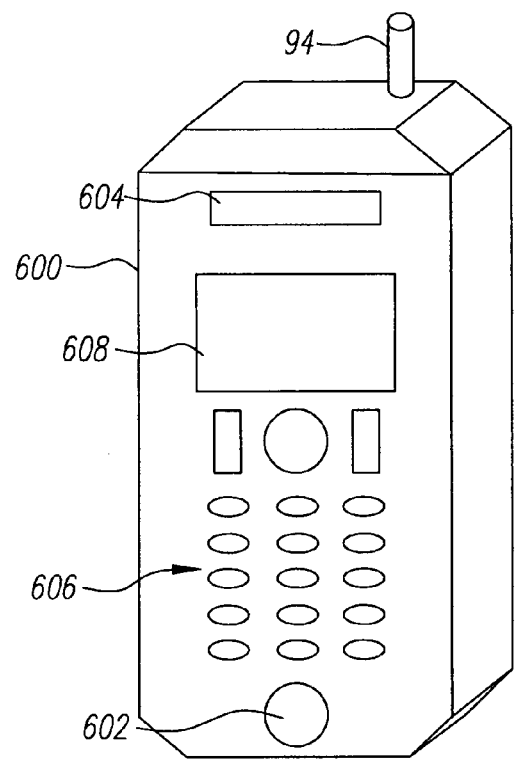
FIGS. 23A and 23B are perspective views of the front and back of a cell phone including a camera with multiple lenses and multiple sensors.
Figure 23B:
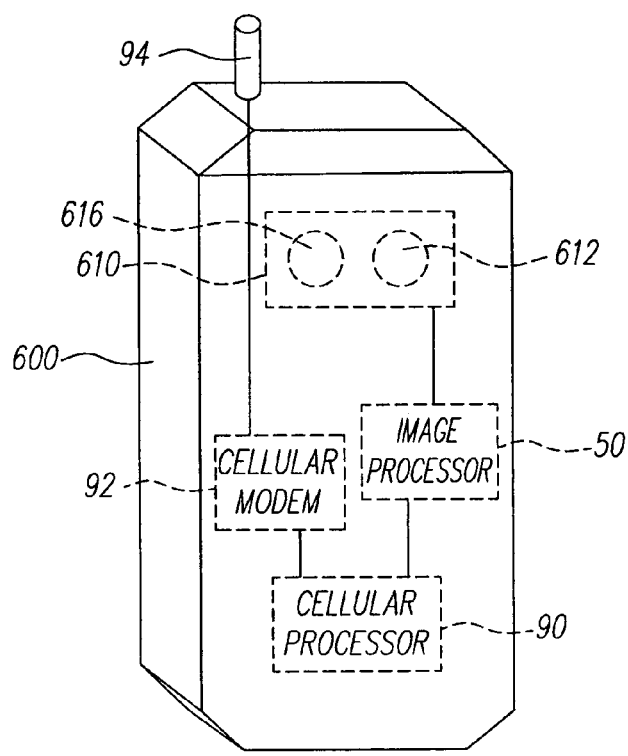

The concept of multiple lenses and multiple sensors, and the use of an integrated image capture assembly, may be adapted for use in a cell phone of the type having a picture taking capability. Accordingly, and as shown in FIG. 23A, a cell phone 600 includes a phone stage comprising a microphone 602 for capturing the voice of a caller, related electronics (not shown) for processing the voice signals of the caller and the person called, and a speaker 604 for reproducing the voice of the one called. A keypad 606 is provided for entering phone numbers and image capture commands, and a (LCD) display 608 for showing phone-related data and for reproducing images captured by the phone or received over the cellular network. The rear view of the cell phone 600 shown in FIG. 23B identifies some of the internal components, including a cellular image capture assembly 610 connected via the image processor 50 (as shown in FIG. 1) to a cellular processing stage comprising the cellular processor 90 and the modem 92. The cellular processor 90 receives and processes the image data from the image processor 50 and the voice data captured by the microphone 602, and transfers the image and voice data to the cellular modem 92. The cellular modem 92 converts the digital image and voice data into the appropriate format for transmission by the antenna 94 to a cellular network.

As the cellular image capture assembly 610 is shown in FIGS. 24A and 24B, where FIG. 24B is a top view of the assembly 610 taken along the lines 24B-24B in FIG. 24A, the assembly 610 comprises an integrated packaging of the optical and imaging components on a common substrate 620. More specifically, the assembly 610 includes a first fixed focal length lens 612 and a first image sensor 614, and a second fixed focal length lens 616 and a second image sensor 618. The first lens 612, preferably a fixed focal length wide angle lens (such as a 40 mm equiv. lens), forms an image on the first image sensor 614, and the second lens 616, preferably a fixed focal length telephoto lens (such as 100 mm equiv. lens), forms an image on the second image sensor 618. Both of the lenses are oriented in the same direction in order to form images of the same portion of the overall scene in front of them, albeit with different fields of view.

Each lens 612 and 616 and each associated image sensor 614 and 618 are mounted to the substrate 620 with an IR cut filter in between to reduce the incidence of IR radiation on the image pixels. Electronic components 624, such as resistors, capacitors and power management components, are also mounted on the substrate 620. The image signals are taken from the substrate 620 via a flex connector 626. The data taken from the assembly 610 may be raw image data, or if suitable processors (not shown) are on board the substrate 620, the data could be YUV image data or JPEG image data. Moreover, the image processor 50 may provide digital zooming between the wide angle and the telephoto focal lengths; the user may initiate such zooming via a user interface displayed on the (LCD) display 608 and by keying appropriate buttons on the keypad 606. Furthermore, the wide angle image sensor 614 may have high resolution, e.g., higher than that of the telephoto image sensor 618, in order to provide a higher quality source image for the digital zooming.

In one embodiment, the wide angle lens 612 is set to its hyperfocal distance, which means it is in focus from a few feet to infinity without need for any focus adjustment by the user. The telephoto lens 616 is automatically focused by an auto focus subsystem 628. This is required because the hyperfocal distance increases as the focal length increases, and so the focus needs to be adjusted in order to obtain proper focus for objects at typical (e.g. 4' to 12') distances. By using only one focusing subsystem 628 for the telephoto lens 616, the cost and size can be reduced.

An important constraint in this embodiment is the "z" dimension 630, which must be held to a very small figure consistent with a cell phone layout and architecture. This may be obtained by careful choice of the telephoto focal length and the size of the sensor. For example, the size of the sensor 616, and consequently the size of the image that must be produced to fill the sensor, may be made small enough to reduce the focal length to an acceptable z dimension 630.

In a further embodiment, as discussed in connection with FIG. 21, the two lenses may have approximately identical focal lengths, with the imaging arrays being of different sizes. With the differently sized imaging arrays, each lens is designed to fill the area of the imaging array and each lens-array combination will have substantially the same actual focal length, i.e., the same lens to array distance.

However, the 35 mm equiv. of each lens will be different; consequently, each lens will have a different field of view.

While not shown in detail in FIGS. 24A and 24B, but similarly as was explained in connection with FIG. 1, an analog output signal from the first image sensor 614 is amplified by a first analog signal processor and provided to a first input of a control element, e.g., an analog multiplexer control element provided as one of the electronic components 624 on the substrate 620. The analog output signal from the second image sensor 618 is amplified by a second analog signal processor and provided to a second input of the control element. The function of the control element is to select either the first sensor output from the first image sensor 614 or the second sensor output from the second image sensor 618, depending on user input from the keypad 606 as to zoom selection, thereby providing a selected sensor output from the cellular image capture assembly 600 to the image processor 50.

The invention has been described in detail with particular reference to certain preferred embodiments thereof, but it will be understood that variations and modifications can be effected within the spirit and scope of the invention.

PARTS LIST 1 image capture assembly
1a optical relay subassembly
1b optical relay subassembly
1c optical relay subassembly
1a(1) first optical relay subassembly
1a(2) second optical relay subassembly
1a(3) third optical relay subassembly
1a(4) fourth optical relay subassembly
1d front optical profile of the camera
2 fixed focal length lens
2a first fixed focal length lens
2b second fixed focal length lens
2c third fixed focal length lens
2d fourth fixed focal length lens
2e first image sensor output
3 first zoom lens
4 (second) zoom lens
5a zoom and focus motors
5b zoom and focus motors
5c connecting gear train
6a lens barrel
6b fixture
7a relay lens components
7b movable relay (zoom) lens components
8a mirror prism
8b mirror prism
9a aperture shutter assembly
9b aperture shutter assembly
10A digital camera (first embodiment)
10B digital camera (second embodiment)
10C digital camera (third embodiment)
10D digital camera (fourth embodiment)
10E digital camera (fifth embodiment)
10F digital camera (sixth embodiment)
10G digital camera (seventh embodiment)
12 first image sensor
12a first image sensor
12b second image sensor
12c third image sensor
12d fourth image sensor
12e first image output
13 clock drivers
14 second image sensor
14e second image output
15 clock drivers
16 third image sensor
16e third image output
17 clock drivers
18 16:9 aspect ratio panoramic image
18a horizontal margin
18b vertical margin
19 4:3 aspect ratio image
22 first analog signal processor (ASP1)
24 second analog signal processor (ASP2)
26 third analog signal processor (ASP3)
34 control element (analog multiplexer)
36 analog-to-digital converter
38 DRAM buffer memory
40 control processor and timing generator
42 user controls
42a shutter button
42b panoramic button
42c zoom button
42d multi-position selector
46 automatic focus and automatic exposure detectors
48 electronic flash
50 image processor
52 memory card interface
54 removable memory card
56 RAM memory
58 firmware memory
62 host interface
64 interconnection
66 host PC
70 color LCD image display
90 cellular processor
92 cellular modem
94 antenna
100 lens setting block
102 panoramic decision block
104 second sensor block
106 preview block
108 zoom adjustment block
110 capture block
112 power down block
114 first sensor block
115 third sensor block
116 preview block
118 aspect ratio adjustment block
120 capture block
122 zoom position block
124 first sensor block
126 preview block
128 zoom button block
130 capture block
134 second sensor block
136 preview block
138 zoom button block
140 capture block
201 width-wise dimension
204 battery
210 front to rear dimension
300 power up block
302 zoom position X block
304 first sensor block
306 digital zoom block
308 preview block
310 zoom button block
312 capture block 314 zoom position Y block
316 second sensor block
318 third sensor block
320 removed section
322 yes response
402a first lens
402b second lens
412a first (smaller) sensor
412b second (larger) sensor
500 first zoom range
502 second zoom range
503 one step gap
504 17 step zoom sequence
506 9 step zoom sequence
600 cell phone
602 microphone
604 speaker
606 keypad
608 (LCD) display
610 cellular image capture assembly
612 first fixed focal length lens
614 first image sensor
616 second fixed focal length lens
618 second image sensor
620 substrate
622 IR cut filter
624 electronic components
626 flex connector
628 auto focus subsystem
630 z dimension

The invention claimed is:

1. An optical image capture assembly for use in an electronic camera, wherein the camera is contained by an enclosure that includes the optical image capture assembly and provides a front surface through which respective lenses of the optical image capture assembly protrude, said assembly comprising:

a first optical subassembly comprising a first image sensor for generating a first sensor output and a first lens for forming a first image of a scene on the first image sensor;

a second optical subassembly comprising a second image sensor for generating a second sensor output and a zoom lens pointing in the same direction as the first lens and forming a second image of the scene on the second image sensor, wherein the zoom lens is adjustable between a minimum focal length and a maximum focal length to provide the second image, and wherein at least one of the first lens and the zoom lens comprises a folded optical system including an outer objective and relay optics for forming an image through a folded optical path between the outer objective and its respective image sensor in order to conserve space within the enclosure; and means for supporting the first and second optical subassemblies within the enclosure whereby the first lens and the zoom lens, including the outer objective of the folded optical system, protrude through the front surface of the enclosure and are substantially coplanar with said front surface.

2. The assembly as claimed in claim 1 further including a control section for driving the sensors and for selecting either the first sensor output from the first image sensor or the second sensor output from the second image sensor.

3. The assembly as claimed in claim 1 wherein the first lens has a fixed focal length.

4. The assembly as claimed in claim 1 wherein the first lens is an additional zoom lens.

5. The assembly as claimed in claim 1 further comprising:

at least one additional image sensor for generating a corresponding sensor output; and at least one additional lens for forming a corresponding image of the scene on the additional image sensor.

6. The assembly as claimed in claim 5 wherein at least one of the additional lenses is a zoom lens.

7. The assembly as claimed in claim 1 wherein the sensors are packaged in a common integrated circuit package.

8. The assembly as claimed in claim 7 wherein the lenses are provided in a common assembly that mounts onto the integrated circuit package.

9. The assembly as claimed in claim 1 wherein both the first lens and the zoom lens form their images through a folded optical system in which an optical path between the lens and its respective image sensor is folded at an angle in order to conserve space within the enclosure.

10. The assembly as claimed in claim 1 wherein at least one of the first lens and the zoom lens is a prism lens.

* * * * *